United States Patent
Kim et al.

(10) Patent No.: US 11,164,285 B2
(45) Date of Patent: Nov. 2, 2021

(54) ELECTRONIC DEVICE AND METHOD FOR DISPLAYING IMAGE ON A DISPLAY TO PREVENT BURN-IN OF THE DISPLAY

(71) Applicant: Samsung Electronics Co., Ltd., Gyeonggi-do (KR)

(72) Inventors: Han Yu Ool Kim, Seoul (KR); Matheus Farias Miranda, Gyeonggi-do (KR); Yo Han Lee, Seoul (KR); Jong Kon Bae, Seoul (KR); Dong Kyoon Han, Gyeonggi-do (KR); Kwang Tai Kim, Gyeonggi-do (KR); Dong Hyun Yeom, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/690,518

(22) Filed: Nov. 21, 2019

(65) Prior Publication Data

US 2020/0090301 A1    Mar. 19, 2020

Related U.S. Application Data

(63) Continuation of application No. 15/658,690, filed on Jul. 25, 2017, now abandoned.

(30) Foreign Application Priority Data

Jul. 25, 2016   (KR) .......................... 10-2016-0094127

(51) Int. Cl.
*G09G 3/3208* (2016.01)
*G06T 3/20* (2006.01)
(Continued)

(52) U.S. Cl.
CPC ................ *G06T 3/20* (2013.01); *G06T 7/246* (2017.01); *G06T 7/262* (2017.01); *G09G 3/3208* (2013.01);
(Continued)

(58) Field of Classification Search
None
See application file for complete search history.

(56) References Cited

U.S. PATENT DOCUMENTS

| 7,525,514 B2 | 4/2009 | Ohno |
| 7,867,899 B2 | 1/2011 | Fang et al. |

(Continued)

FOREIGN PATENT DOCUMENTS

| CN | 1694588 A | 11/2005 |
| CN | 101750951 A | 6/2010 |

(Continued)

OTHER PUBLICATIONS

Chinese Search Report dated Aug. 2, 2021.

*Primary Examiner* — Stephen G Sherman
*Assistant Examiner* — Donna V Bocar
(74) *Attorney, Agent, or Firm* — Cha & Reiter, LLC

(57) ABSTRACT

An electronic device includes a display, a display driver integrated circuit (DDI) electrically coupled with the display, a memory that stores an image, and a processor. The processor is configured to analyze at least one feature of the image and to determine at least one of a movement range, a movement interval, and a movement period of the image based on the at least one feature. The DDI is configured to display the image in the display when at least part of the processor is deactivated, and to change a display location of the image within the movement range depending on the movement interval and the movement period.

4 Claims, 13 Drawing Sheets

(51) Int. Cl.
*G06T 7/262* (2017.01)
*G06T 7/246* (2017.01)

(52) U.S. Cl.
CPC .............. *G06T 2207/10024* (2013.01); *G09G 2320/0295* (2013.01); *G09G 2320/046* (2013.01); *G09G 2340/0464* (2013.01); *G09G 2340/14* (2013.01); *G09G 2360/16* (2013.01)

(56) References Cited

U.S. PATENT DOCUMENTS

| | | | |
|---|---|---|---|
| 7,911,423 | B2 | 3/2011 | Kim et al. |
| 8,237,750 | B2 | 8/2012 | Polak et al. |
| 8,355,647 | B2 | 1/2013 | Ootsuka |
| 9,099,037 | B2 | 8/2015 | Shin et al. |
| 9,240,418 | B2 | 1/2016 | Fang et al. |
| 9,323,366 | B2 | 4/2016 | Chien et al. |
| 9,465,460 | B2 | 10/2016 | Chien et al. |
| 9,697,765 | B2 | 7/2017 | Chung et al. |
| 9,715,848 | B2 | 7/2017 | Kim et al. |
| 2005/0243033 | A1 | 11/2005 | Kim et al. |
| 2006/0001601 | A1 | 1/2006 | Ono |
| 2007/0096767 | A1* | 5/2007 | Tsai ................. G09G 3/007 324/760.01 |
| 2007/0236410 | A1 | 10/2007 | Shimizu |
| 2008/0048951 | A1 | 2/2008 | Naugler, Jr. et al. |
| 2008/0111886 | A1 | 5/2008 | Bai |
| 2009/0268500 | A1 | 10/2009 | Fang et al. |
| 2010/0103198 | A1 | 4/2010 | Polak et al. |
| 2012/0236040 | A1 | 9/2012 | Eom et al. |
| 2012/0256971 | A1 | 10/2012 | Shin et al. |
| 2013/0293597 | A1 | 11/2013 | Mori et al. |
| 2014/0146186 | A1 | 5/2014 | Ju et al. |
| 2014/0168039 | A1 | 6/2014 | Kim et al. |
| 2015/0130860 | A1 | 5/2015 | Park et al. |
| 2015/0243201 | A1 | 8/2015 | Chung et al. |
| 2015/0339980 | A1* | 11/2015 | Yamazaki ............ G09G 3/3225 345/691 |
| 2018/0012332 | A1* | 1/2018 | Ishihara ................ G06T 11/001 |
| 2018/0277027 | A1* | 9/2018 | Misawa ................ B60K 35/00 |

FOREIGN PATENT DOCUMENTS

| | | |
|---|---|---|
| CN | 103425335 A | 12/2013 |
| JP | 2014-123126 A | 7/2014 |
| KR | 10-2005-0105582 A | 11/2005 |
| KR | 10-2008-0060890 A | 7/2008 |
| KR | 10-2012-0106558 A | 9/2012 |
| KR | 10-2012-0114988 A | 10/2012 |
| KR | 10-2013-0066202 A | 6/2013 |
| KR | 10-2015-0101507 A | 9/2015 |

* cited by examiner

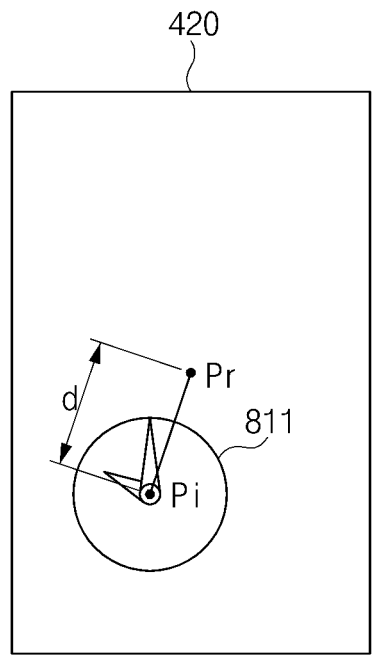
<801>
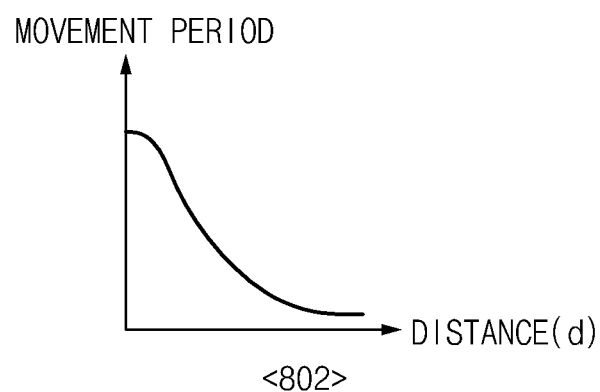
<802>
FIG.8

| IMAGE TYPE | Digital clock | | Analog clock | | Circle theme | | London theme | |
|---|---|---|---|---|---|---|---|---|
| CASE | Original | Proposed | Original | Proposed | Original | Proposed | Original | Proposed |
| MAXIMUM GRADIENT | 196 | 148 | 124 | 104 | 216 | 116 | 100 | 76 |
| GRDIENT CROSS SECTION | 912 | 913 | 922 | 923 | 932 | 933 | 942 | 943 |
| Image | 911 | | 921 | | 931 | | 941 | |

FIG.9

ELECTRONIC DEVICE AND METHOD FOR DISPLAYING IMAGE ON A DISPLAY TO PREVENT BURN-IN OF THE DISPLAY

CROSS-REFERENCE TO RELATED APPLICATIONS

This application is a Continuation of U.S. patent application Ser. No. 15/658,690 filed on Jul. 25, 2017 which claims the benefit under 35 U.S.C. § 119(a) of a Korean patent application filed on Jul. 25, 2016 in the Korean Intellectual Property Office and assigned Serial number 10-2016-0094127, the entire disclosure of which is hereby incorporated by reference.

TECHNICAL FIELD

The present disclosure relates to a method for displaying an image in a display of an electronic device, and the electronic device thereof.

BACKGROUND

As technology develops, various types of electronic products are being developed and distributed. In particular, portable electronic devices having displays, such as smart phones, tablet personal computer PCs, or the like has become increasingly popular.

Display panels included in these electronic devices may be plasma display panels (PDP), liquid crystal display (LCD) panels, organic light emitting diode (OLED) panels, and the like.

In OLED displays, when a static image is continuously displayed for a relatively long period of time, the continuous operation of the pixels of the OLED display to display the same color may cause permanent discoloration of the pixels. This phenomenon is commonly known as "burn-in."

Recently, an added feature for electronic device is an Always-On Display (AOD) function where the display is operational even when the electronic device is in sleep mode. OLED displays operating with an AOD function may be susceptible to burn-in.

SUMMARY

Aspects of the present disclosure address at least the above-mentioned problems and/or disadvantages and provide at least the advantages described below. Accordingly, an aspect of the present disclosure is to prevent or suppress burn-in that occurs in OLED displays.

In accordance with an aspect of the present disclosure, an electronic device includes a display, a display driver integrated circuit (DDI) electrically coupled with the display, a memory that stores an image, and a processor. The processor is configured to analyze at least one feature of the image and to determine at least one of a movement range, a movement interval, and a movement period of the image based on the at least one feature. The DDI is configured to display the image in the display when at least part of the processor is deactivated, and to change a display location of the image within the movement range depending on the movement interval and the movement period.

In accordance with an aspect of the present disclosure, an image displaying method of an electronic device includes analyzing at least one feature of the image using a processor, determining, using the processor, at least one of a movement range, a movement interval, and a movement period of the image based on the at least one feature, displaying the image in a display when at least part of the processor is deactivated, and changing a display location of the image within the movement range depending on the movement interval and the movement period.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 illustrates a movement period of an image, according to one embodiment of the present disclosure;

FIG. 9 illustrates a burn-in phenomenon preventing effect, according to one embodiment of the present disclosure;

Throughout the drawings, it should be noted that like reference numbers are used to depict the same or similar elements, features, and structures.

DETAILED DESCRIPTION

Figure 1:
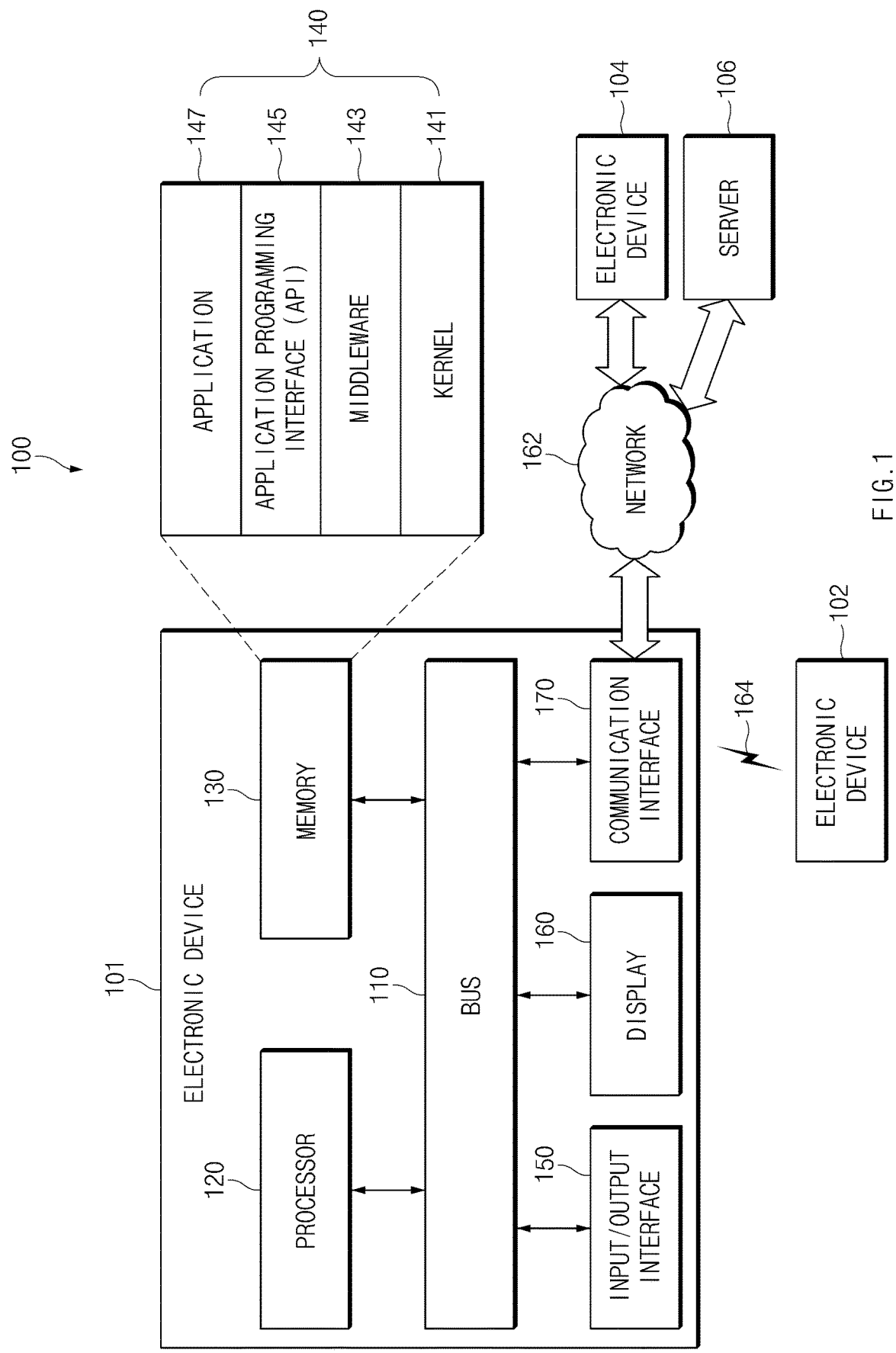
FIG. 1 illustrates an electronic device, according to one embodiment of the present disclosure.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The term "include," "comprise," and "have," "may include," "may comprise," and/or "may have" used herein indicates disclosed functions, operations, or existence of elements but does not exclude other functions, operations or elements.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art unless expressly so defined herein in the disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include other electronic devices as they are known or will be known in the art.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses the electronic device.

FIG. 1 illustrates an electronic device in a network environment according to an embodiment of the present disclosure.

An electronic device 101 in a network environment 100 according to one embodiment of the present disclosure will be described with reference to FIG. 1. The electronic device 101 may include a bus 110, a processor 120, a memory 130, an input/output interface 150, a display 160, and a communication interface 170. In various embodiments of the present disclosure, at least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a central processing unit (CPU), an application processor (AP), or a communication processor (CP). The processor 120 may perform data processing or an operation related to communication and/or control of at least one of the other elements of the electronic device 101. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141.

Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, or the like) of the electronic device 101. For example, the middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, or the like.

The input/output interface 150 may serve to transfer an instruction or data input from a user or another external device to (an)other element(s) of the electronic device 101. Furthermore, the input/output interface 150 may output instructions or data received from (an)other element(s) of the electronic device 101 to the user or another external device.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

The communication interface 170 may set communications between the electronic device 101 and an external device (e.g., a first external electronic device 102, a second external electronic device 104, or a server 106). For example, the communication interface 170 may be connected to a network 162 via wireless communications or wired communications so as to communicate with the external device (e.g., the second external electronic device 104 or the server 106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 164. The short-range communications may include at least one of wireless fidelity (Wi-Fi), Bluetooth, Bluetooth low energy (BLE), Zigbee, near field communication (NFC), magnetic secure transmission (MST), or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), or the like. The network 162 may include at least one of telecommunications networks, for example, a computer network (e.g., local area network (LAN) or wide area network (WAN)), the Internet, or a telephone network.

The types of the first external electronic device 102 and the second external electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first external electronic device 102, the second external electronic device 104, or the server 106). When the electronic device 101 should perform a certain function or service automatically or in response to a request, the electronic device 101 may request at least a portion of functions related to the function or service from another device (e.g., the first external electronic device 102, the second external electronic device 104, or the server 106) instead of or in addition to performing the function or service for itself. The other electronic device (e.g., the first external electronic device 102, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 2:
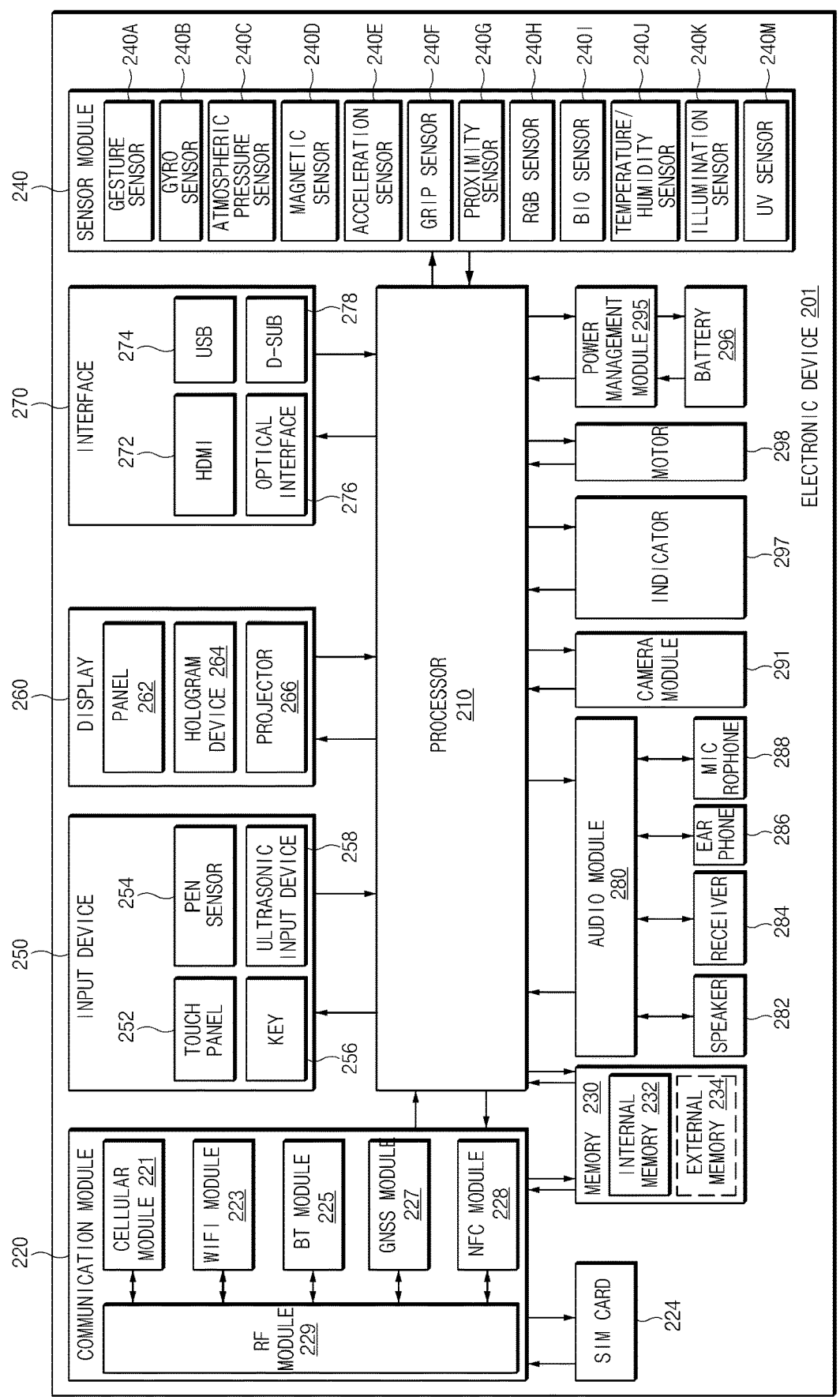
FIG. 2 is a block diagram of the electronic device, according to one embodiment of the present disclosure.

FIG. 2 is a block diagram illustrating an electronic device according to an embodiment of the present disclosure.

Referring to FIG. 2, an electronic device 201 may include, for example, a part or the entirety of the electronic device 101 illustrated in FIG. 1. The electronic device 201 may include at least one processor (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may run an operating system or an application program so as to control a plurality of hardware or software elements connected to the processor 210, and may process various data and perform operations. The processor 210 may be implemented with, for example, a system on chip (SoC). According to an embodiment of the present disclosure, the processor 210 may further include a graphic processing unit (GPU) and/or an image signal processor. The processor 210 may include at least a portion (e.g., a cellular module 221) of the elements illustrated in FIG. 2. The processor 210 may load, on a volatile memory, an instruction or data received from at least one of other elements (e.g., a nonvolatile memory) to process the instruction or data, and may store various data in a nonvolatile memory.

The communication module 220 may have a configuration that is the same as or similar to that of the communication interface 170 of FIG. 1. The communication module 220 may include, for example, a cellular module 221, a Wi-Fi module 223, a Bluetooth module 225, a GNSS module 227 (e.g., a GPS module, a GLONASS module, a BeiDou module, or a Galileo module), an NFC module 228 and a radio frequency (RF) module 229.

The cellular module 221 may provide, for example, a voice call service, a video call service, a text message service, or an Internet service through a communication network. The cellular module 221 may identify and authenticate the electronic device 201 in the communication network using the subscriber identification module 224 (e.g., a SIM card). The cellular module 221 may perform at least a part of functions that may be provided by the processor 210. The cellular module 221 may include a communication processor (CP).

Each of the Wi-Fi module 223, the Bluetooth module 225, the GNSS module 227 and the NFC module 228 may include, for example, a processor for processing data transmitted/received through the modules. According to some various embodiments of the present disclosure, at least a part (e.g., two or more) of the cellular module 221, the Wi-Fi module 223, the Bluetooth module 225, the GNSS module 227 and the NFC module 228 may be included in a single integrated chip (IC) or IC package.

The RF module 229 may transmit/receive, for example, communication signals (e.g., RF signals). The RF module 229 may include, for example, a transceiver, a power amp module (PAM), a frequency filter, a low noise amplifier (LNA), an antenna, or the like. According to another embodiment of the present disclosure, at least one of the cellular module 221, the Wi-Fi module 223, the Bluetooth module 225, the GNSS module 227 and the NFC module 228 may transmit/receive RF signals through a separate RF module.

The SIM 224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 234 may include a flash drive such as a compact flash (CF), a secure digital (SD), a Micro-SD, a Mini-SD, an extreme digital (xD), a MultiMediaCard (MMC), a memory stick, or the like. The external memory 234 may be operatively and/or physically connected to the electronic device 201 through various interfaces.

A security module 236, which is a module including a storage space that is higher in security level than the memory 230, may be a circuit for securing safe data storage and protected execution circumstances. The security module 236 may be implemented with an additional circuit and may include an additional processor. The security module 236 may be present in an attachable smart chip or SD card, or may include an embedded secure element (eSE), which is installed in a fixed chip. Additionally, the security module 236 may be driven in another OS which is different from the OS of the electronic device 201. For example, the security module 236 may operate based on a java card open platform (JCOP) OS.

The sensor module 240 may, for example, measure physical quantity or detect an operation state of the electronic device 201 so as to convert measured or detected information into an electrical signal. The sensor module 240 may include, for example, at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red/green/blue (RGB) sensor), a biometric sensor 240I, a temperature/humidity sensor 240J, an illumination sensor 240K, or an ultraviolet (UV) sensor 240M. Additionally or alternatively, the sensor module 240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 240 may further include a control circuit for controlling at least one sensor included therein. In some various embodiments of the present disclosure, the electronic device 201 may further include a processor configured to control the sensor module 240 as a part of the processor 210 or separately, so that the sensor module 240 is controlled while the processor 210 is in a sleep state.

The input device 250 may include, for example, a touch panel 252, a (digital) pen sensor 254, a key 256, or an ultrasonic input device 258. The touch panel 252 may employ at least one of capacitive, resistive, infrared, and ultraviolet sensing methods. The touch panel 252 may further include a control circuit. The touch panel 252 may further include a tactile layer so as to provide a haptic feedback to a user.

The (digital) pen sensor 254 may include, for example, a sheet for recognition which is a part of a touch panel or is separate. The key 256 may include, for example, a physical button, an optical button, or a keypad. The ultrasonic input device 258 may sense ultrasonic waves generated by an input tool through a microphone 288 so as to identify data corresponding to the ultrasonic waves sensed.

The display 260 (e.g., the display 160) may include a panel 262, a hologram device 264, or a projector 266. The panel 262 may have a configuration that is the same as or similar to that of the display 160 of FIG. 1. The panel 262 may be, for example, flexible, transparent, or wearable. The panel 262 and the touch panel 252 may be integrated into a single module. The hologram device 264 may display a stereoscopic image in a space using a light interference phenomenon. The projector 266 may project light onto a screen so as to display an image. The screen may be disposed in the inside or the outside of the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270, for example, may be included in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may convert, for example, a sound into an electrical signal or vice versa. At least a portion of elements of the audio module 280 may be included in the input/output interface 150 illustrated in FIG. 1. The audio module 280 may process sound information input or output through a speaker 282, a receiver 284, an earphone 286, or the microphone 288.

The camera module 291 is, for example, a device for shooting a still image or a video. According to an embodiment of the present disclosure, the camera module 291 may include at least one image sensor (e.g., a front sensor or a rear sensor), a lens, an image signal processor (ISP), or a flash (e.g., an LED or a xenon lamp).

The power management module 295 may manage power of the electronic device 201. According to an embodiment of the present disclosure, the power management module 295 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, or the like. The motor 298 may convert an electrical signal into a mechanical vibration, and may generate a vibration or haptic effect. Although not illustrated, a processing device (e.g., a GPU) for supporting a mobile TV may be included in the electronic device 201. The processing device for supporting a mobile TV may process media data according to the standards of digital multimedia broadcasting (DMB), digital video broadcasting (DVB), MediaFLO™, or the like.

Figure 3:
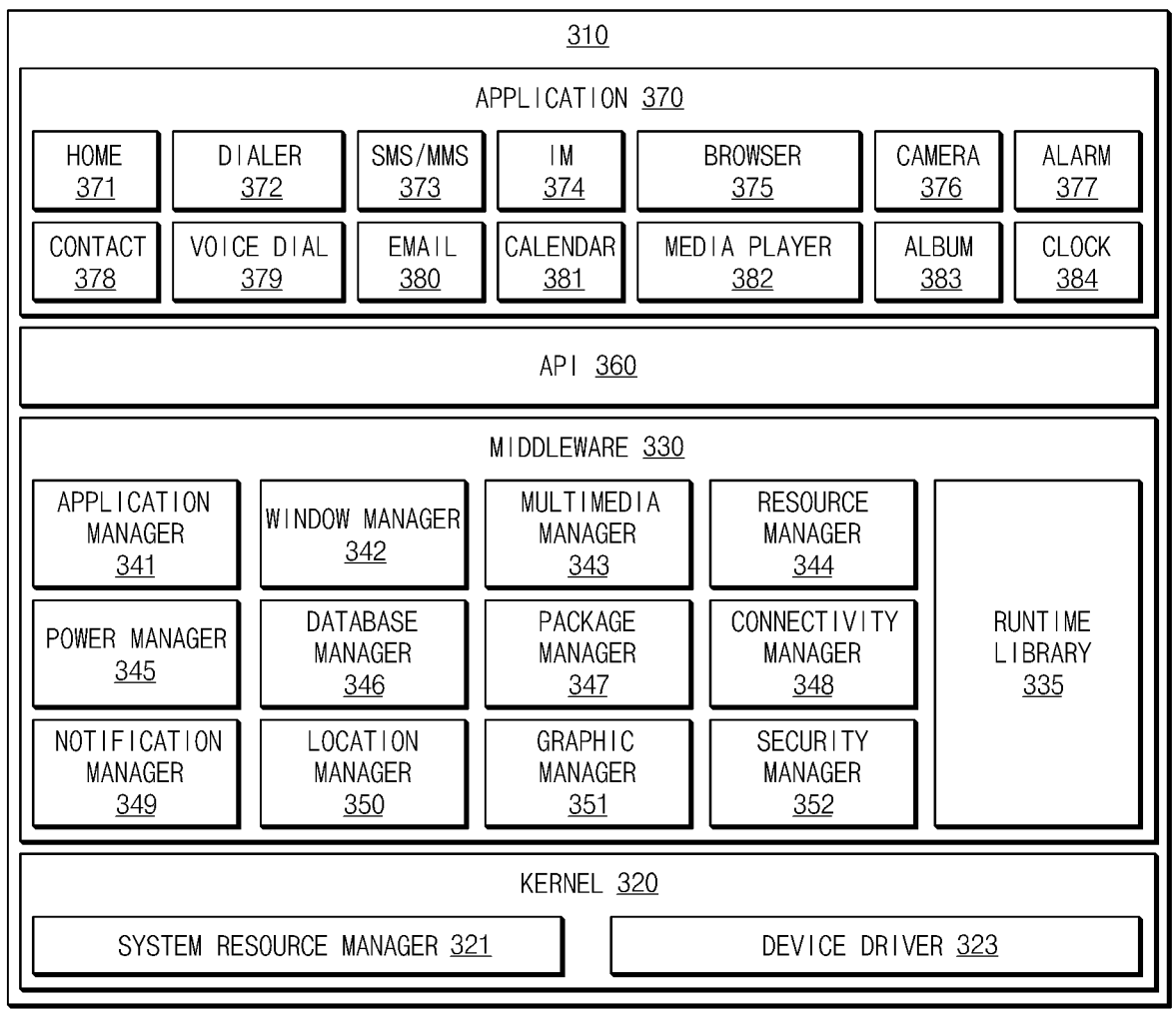
FIG. 3 is a block diagram of a program module, according to one embodiment of the present disclosure.

FIG. 3 is a block diagram of a program module according to an embodiment of the present disclosure.

Referring to FIG. 3, a program module 310 (e.g., the program 140) may include an operating system (OS) for controlling a resource related to an electronic device (e.g., the electronic device 101) and/or various applications (e.g., the application program 147) running on the OS. The operating system may be, for example, Android, iOS, Windows, Symbian, Tizen, or the like.

The program module 310 may include a kernel 320, a middleware 330, an API 360, and/or an application 370. At least a part of the program module 310 may be preloaded on an electronic device or may be downloaded from an external electronic device (e.g., the first external electronic device 102, the second external electronic device 104, or the server 106).

The kernel 320 (e.g., the kernel 141) may include, for example, a system resource manager 321 or a device driver 323. The system resource manager 321 may perform control, allocation, or retrieval of a system resource. According to an embodiment of the present disclosure, the system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330, for example, may provide a function that the applications 370 require in common, or may provide various functions to the applications 370 through the API 360 so that the applications 370 may efficiently use limited system resources in the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 and a security manager 352.

The runtime library 335 may include, for example, a library module that a complier uses to add a new function through a programming language while the application 370 is running. The runtime library 335 may perform a function for input/output management, memory management, or an arithmetic function.

The application manager 341 may mange, for example, a life cycle of at least one of the applications 370. The window manager 342 may manage a GUI resource used in a screen. The multimedia manager 343 may recognize a format required for playing various media files and may encode or decode a media file using a codec matched to the format. The resource manager 344 may manage a resource such as a source code, a memory, or a storage space of at least one of the applications 370.

The power manager 345, for example, may operate together with a basic input/output system (BIOS) to manage a battery or power and may provide power information required for operating the electronic device. The database manager 346 may generate, search, or modify a database to be used in at least one of the applications 370. The package manager 347 may manage installation or update of an application distributed in a package file format.

The connectivity manager 348 may manage wireless connection of Wi-Fi, Bluetooth, or the like. The notification manager 349 may display or notify an event such as message arrival, appointments, and proximity alerts in such a manner as not to disturb a user. The location manager 350 may manage location information of the electronic device. The graphic manager 351 may manage a graphic effect to be provided to a user or a user interface related thereto. The security manager 352 may provide various security functions required for system security or user authentication. According to an embodiment of the present disclosure, in the case in which an electronic device (e.g., the electronic device 101) includes a phone function, the middleware 330 may further include a telephony manager for managing a voice or video call function of the electronic device.

The middleware 330 may include a middleware module for forming a combination of various functions of the above-mentioned elements. The middleware 330 may provide a module specialized for each type of an operating system to provide differentiated functions. Furthermore, the middleware 330 may delete a part of existing elements or may add new elements dynamically.

The API 360 (e.g., the API 145) which is, for example, a set of API programming functions may be provided in different configurations according to an operating system. For example, in the case of Android or iOS, one API set may be provided for each platform, and, in the case of Tizen, at least two API sets may be provided for each platform.

The application 370 (e.g., the application program 147), for example, may include at least one application capable of performing functions such as home screen 371, dialer 372, SMS/MMS 373, instant message (IM) 374, browser 375, camera 376, alarm 377, contacts 378, voice dial 379, e-mail 380, calendar 381, media player 382, image album 383, clock 384, health care (e.g., measure an exercise amount or blood sugar), or environmental information provision (e.g., provide air pressure, humidity, or temperature information).

According to an embodiment of the present disclosure, the application 370 may include an information exchange application for supporting information exchange between the electronic device (e.g., the electronic device 101) and an external electronic device (e.g., the first external electronic device 102 or the second external electronic device 104). The information exchange application may include, for example, a notification relay application for relaying specific information to the external electronic device or a device management application for managing the external electronic device.

For example, the notification relay application may have a function for relaying, to an external electronic device (e.g., the first external electronic device 102 or the second external electronic device 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements), adjust the brightness or resolution of the display, etc.) of the external electronic device (e.g., the first external electronic device 102 or the second external electronic device 104) communicating with the electronic device, an application running in the external electronic device, or a service (e.g., a call service, a message service, or the like) provided from the external electronic device.

According to an embodiment of the present disclosure, the application 370 may include a specific application (e.g., a healthcare application for a mobile medical device) according to an attribute of the external electronic device (e.g., the first external electronic device 102 or the second external electronic device 104). The application 370 may include an application received from an external electronic device (e.g., the first external electronic device 102 or the second external electronic device 104). The application 370 may include a preloaded application or a third-party application downloadable from a server. The names of the elements of the program module 310 illustrated may vary according to the type of the operating system.

According to one embodiment of the present disclosure, at least a part of the program module 310 may be implemented with software, firmware, hardware, or a combination thereof. At least a part of the program module 310, for example, may be implemented (e.g., executed) by a processor (e.g., the processor 210). At least a part of the program module 310 may include, for example, a module, a program, a routine, sets of instructions, or a process for performing at least one function.

Figure 4:
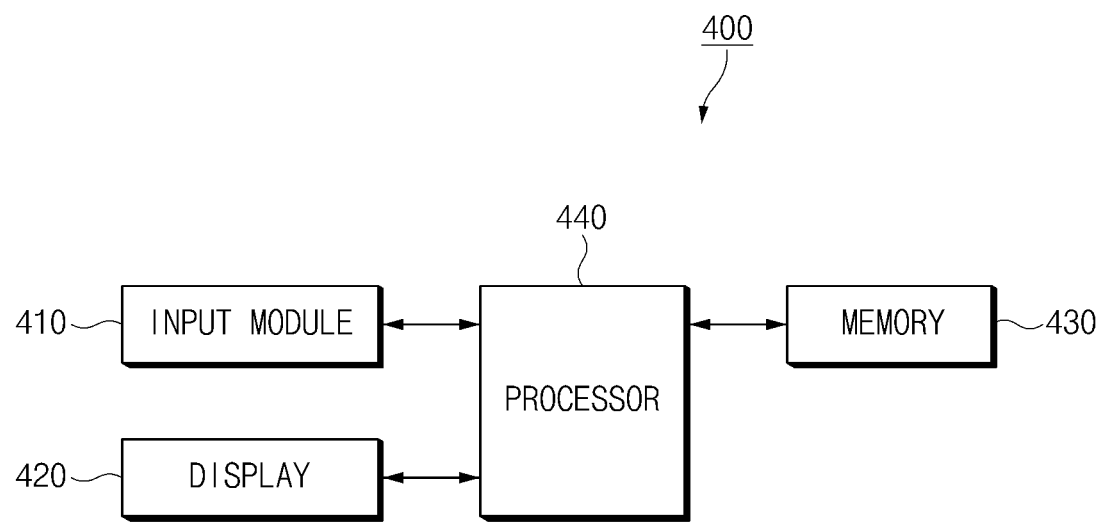
FIG. 4 is a block diagram illustrating a configuration of an electronic device, according to one embodiment of the present disclosure.

FIG. 4 is a block diagram illustrating a configuration of an electronic device, according to one embodiment of the present disclosure.

Referring to FIG. 4, an electronic device 400 may include an input module 410, a display 420, a memory 430, and a processor 440. The electronic device 400 may include a normal mode and a low power mode. For example, the normal mode be the awake mode, in which all the elements 410 to 440 included in the electronic device 400 are activated or operating without power reduction. In contrast, the low power mode may be the sleep mode, in which at least some of elements 410 to 440 included in the electronic device 400 are deactivated or operating under low power conditions. For example, the electronic device 400 may deactivate a part of the processor 440 (e.g., the main processor) in the low power mode. Alternatively, in the low power mode the electronic device 400 may drive the input module 410 such that the input module 410 senses whether the user input is received, without determining the location of the user input. As another example, the electronic device 400 may drive the display 420 in the low power mode (e.g., an AMOLED low power mode (ALPM)).

According to an embodiment, the electronic device 400 may provide an always on display (AOD) function in the low power mode. For example, operating in the AOD function, the display 420 may display an image (or image data) in at least a partial area of the display 420 even when the electronic device 400 operates in the low power mode.

According to an embodiment, the input module 410 may receive a user input. For example, the input module 410 may receive the user input for activating the AOD function. As another example, the input module 410 may receive the user input for selecting an image to be displayed on the display 420 during the AOD function. For example, the image (or image data) may include at least one object of a figure, a character, a symbol, and text. For example, a user may select an image, which the user photographs or which is received from an external electronic device, for the AOD function.

In an embodiment, the input module 410 may include a touch sensor panel that senses a touch manipulation of the user or a pen sensor panel that senses a pen manipulation of the user. According to an embodiment, the touch sensor panel may include a pressure sensor for sensing pressure associated with the user touch. The pressure sensor may be integrally implemented with the touch sensor panel or the display 420 or may be implemented with one or more sensors independently of the touch sensor panel.

According to an embodiment, the display 420 may display an image. According to an embodiment, the display 420 may display the image when the electronic device 400 operates in the low power mode (e.g., a sleep mode) as well as when the electronic device 400 operates in the normal mode (e.g., an awake mode).

According to an embodiment, the display 420 may change the location of the image depending on at least one of a movement range, a movement interval, and a movement period that are set for the image. For example, the display 420 may change the location of the image within the movement range of the image depending on the movement interval and the movement period.

According to an embodiment, the display 420 may be a light emitting diode (LED) (e.g., an organic light emitting diode (OLED)) display.

According to an embodiment, the input module 410 and the display 420, for example, may be implemented with a touch screen that is capable of displaying images and sensing touch input at the same time. In the touch screen, the touch sensor panel may be disposed over the display panel.

According to an embodiment, the memory 430 may store at least one image. According to an embodiment, the memory 430 may map information about movement range, movement interval, and movement period for images to each image and may store the mapped information.

According to an embodiment, the processor 440 may control overall operations of the electronic device 400. According to one embodiment, the processor 440 (e.g., an application processor) may display an image on the display 420 by controlling the input module 410, the display 420, and the memory 430, respectively. According to an embodiment, the processor 440 may be implemented with a system on chip (SoC) that includes at least one of a processor (e.g., a central processing unit (CPU), a graphic processing unit (GPU), or the like), a memory, or the like.

According to an embodiment, the processor 440 may receive the user input for selecting an image through the input module 410. For example, the processor 440 may receive the user input for selecting an image, such as an AOD image, which is to be displayed on the display 420 during the AOD function.

According to an embodiment, the processor 440 may select at least one of images stored in the memory 430 depending on the user input or a specified standard (e.g., date, time, season, or ambient environment (e.g. illuminance)). According to an embodiment, the processor 440 may analyze at least one feature of the selected image. For example, the processor 440 may analyze at least one of the size (a width size and a height size) of the image, the middle point of the image, the center of gravity of effective pixels included in the image, the effective pixel ratio of the image, the average pixel value of the image, the maximum pixel value of the image, the deviation (e.g., average deviation or standard deviation) of pixel values of the image, the luminance (e.g., maximum luminance or average luminance) of the display 420 when the image is displayed, the on pixel ratio (OPR) of the image, the accumulated stress value of pixels according to the movement of the image, the spatial frequency of the image, etc.

For example, the size of the image may be defined as the width of the image and the height of the image. The image size may be alternatively defined as a ratio of the size of the image to the size of the display. The effective pixel ratio of the image may be the ratio of pixels with pixel values to the total pixels included in the image. The pixel value of a pixel may be a value for each color channel (e.g., red, green, and blue) of the pixel. The average pixel value of the image may be an average pixel value for each color channel of the effective pixels included in the image. The maximum pixel value of the image may be a maximum value among the pixel values for each color channel of the effective pixels included in the image. The deviation of the pixel value of the image may be an average deviation or a standard deviation of pixel values for each color channel of the effective pixels included in the image. The luminance (e.g., average luminance or maximum luminance) of the display 420 when the image is displayed may vary depending on the features of the display 420. The processor 440 may analyze the luminance of the display 420 when the image is displayed. The OPR of the image may be the average pixel value of pixels included in the display 420 when the image is displayed on the display 420. For example, the OPR may be the sum of pixel values of the effective pixels included in the image/(the total number of pixels in the display 420*the maximal pixel values of each pixel in the display 420).

According to an embodiment, the processor 440 may determine whether a feature of the analyzed image satisfies a specified standard or condition. For example, the processor 440 may compare the size of the image, the effective pixel ratio of the image, the average pixel value of the image, the maximum pixel value of the image, the deviation of the pixel values of the image, the luminance (e.g., maximum luminance or average luminance) of the display when the image is displayed, and the OPR of the image to their respective specified standards or conditions.

According to an embodiment, if at least one feature of the analyzed image does not satisfy the specified standard, the processor 440 may modify the image so as to satisfy the specified standard. For example, if the size of the image does not satisfy the specified standard, the processor 440 may reduce the size of the image. As another example, if the average pixel value or the maximum pixel value of the image does not satisfy the specified standard, the processor 440 may darken the image by lowering the pixel value of the image as a whole. As another example, if the OPR of the image does not satisfy the specified standard, the processor 440 may reduce the size of the image, may lower the pixel value of the image, or may remove some of effective pixels of the image. According to one embodiment, the modification of the image may include changing of the feature of the image when the image is displayed on the display 420 and displaying the changed image as well as modifying the image data stored in the memory 430. For example, if the average pixel value, the maximum pixel value, or the OPR of the image does not satisfy their respective specified standards, the processor 440 may lower the luminance of the display 420 by changing the driving mode of the display 420.

Figure 12:
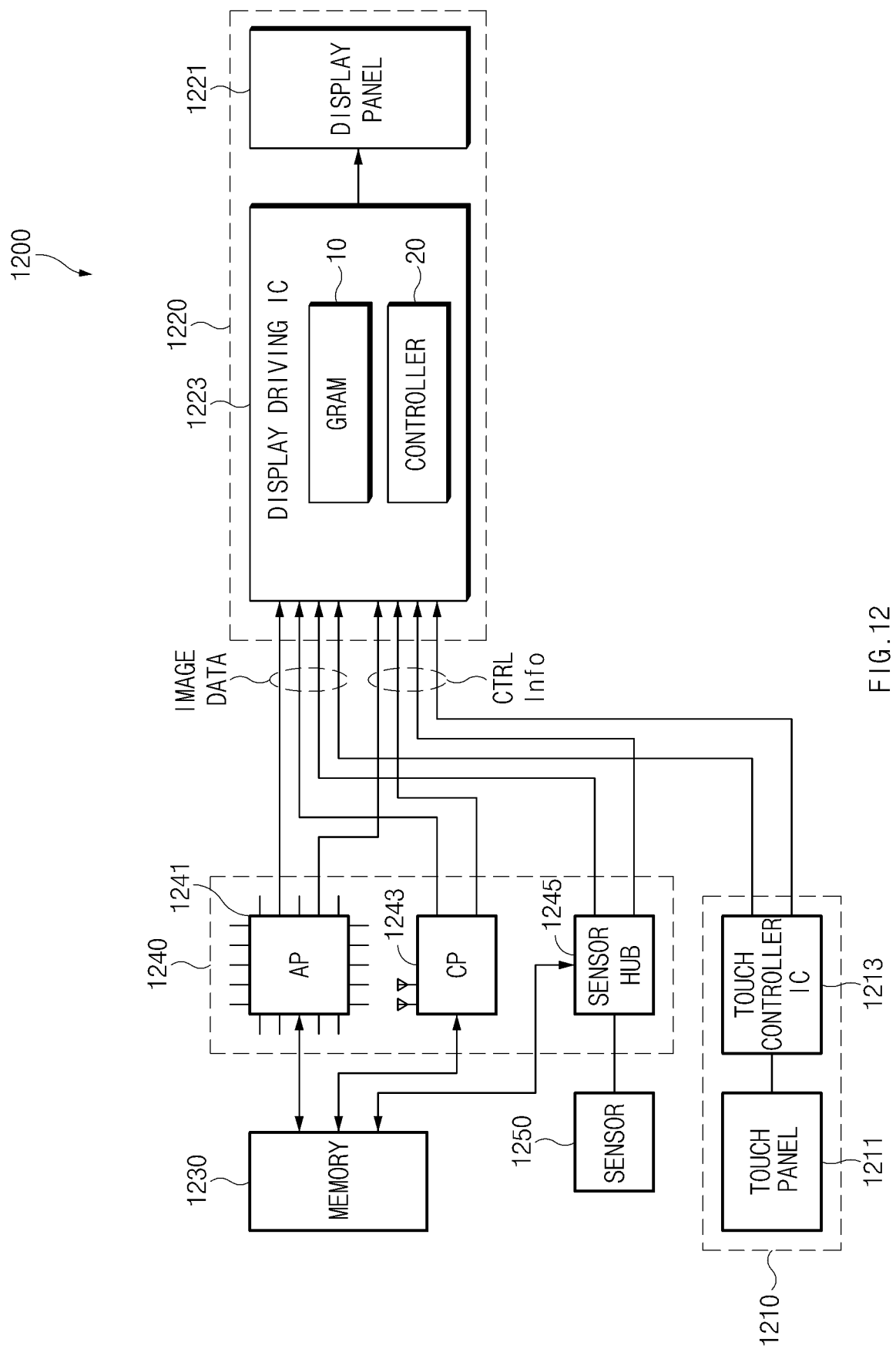
FIG. 12 illustrates a block diagram of the electronic device, according to an embodiment of the present disclosure.

According to another embodiment, the modification of the image may be performed by a circuit (e.g., the display driver integrated circuit (DDI) 1223 of FIG. 12) driving the display 420. For example, if at least one feature of the image does not satisfy the specified standard, the processor 440 may transmit an image modification command to the DDI 1223, and the DDI 1223 may modify the image such that the image satisfies the specified standard.

According to an embodiment, the specified standards may be determined based on the feature of the display 420. The specified standards may be determined based on information about the material of the light emitting device (e.g., OLED) included in the display 420, the life expectancy for each color channel according to the luminance of the display 420, and the like. According to an embodiment, the specified standards may be set in advance when the electronic device 400 is manufactured by the manufacturer of the electronic device 400. According to an embodiment, when the specified standards are not set, the processor 440 may identify the type (or model) of the display 420 and set the specified standards to correspond to the identified display 420.

According to an embodiment, when modifying the image, the processor 440 may modify only one or more objects, or parts of the one or more objects, shown in the image. For example, when reducing the image, the processor 440 may reduce the size of objects in the image without changing the size of the image itself. As another example, when modifying the pixel value of the image, the processor 440 may modify only the pixel values of the pixels used to display the objects in the image.

According to the above-described embodiment, if it is determined that burn-in may occur because the feature of the displayed image does not satisfy the specified standard, the burn-in phenomenon may be prevented by changing the feature of the image.

According to an embodiment, the processor 440 may display the image selected by a user on the display 420. According to an embodiment, when the image is modified because the image selected by the user does not satisfy the specified standards, the processor 440 may display the modified image on the display 420. According to an embodiment, when displaying the image on the display 420, the processor 440 may operate in the low power mode. Alternatively, if entering the low power mode, the processor 440 may display the image on the display 420.

According to an embodiment, the processor 440 may set the at least one of the movement range, the movement interval, and the movement period of the image based on the analyzed feature. According to an embodiment, the processor 440 may change the location of the image, which is displayed on the display 420, within the movement range of the image depending on the movement interval and the movement period.

According to an embodiment, in the case where a plurality of objects are included in the image, the processor 440 may set at least one of the movement range, the movement interval, and the movement period of the image in relation each of the plurality of objects.

The movement range of the image may be a range in which the image may be moved on the display 420 to avoid burn-in. The movement interval of the image may be a distance by which the image may be moved on the display 420. The image displayed on the display 420 may be moved according to the movement interval. Thus, the image is not moved by a distance less than or greater than the movement interval. According to an embodiment, the movement interval of the image may be set with respect to a first axis (e.g., a horizontal axis or an "x" axis) and a second axis (e.g., a vertical axis or a "y" axis) perpendicular to the first axis. The movement period of the image may indicate a time period for the image displayed on the display 420 to be displayed at one location. After being displayed at a particular location for a time period equal to the movement period, the image displayed on the display 420 may move to another location.

According to an embodiment, the processor 440 may set the movement range of the image based on the size of the image. For example, the processor 440 may set the movement range along the first axis (e.g., the horizontal axis or the "x" axis) based on the width of the image. Similarly, the processor 440 may set the movement range along the second axis (e.g., the vertical axis or the "y" axis) based on the height of the image. According to an embodiment, the movement range may increase as the size of the image to be displayed increases. Conversely, the processor 440 may decrease the movement range as the size of the image to be displayed decreases. For example, the processor 440 may set at least part (e.g., all or part) of the display area of the display 420 to be within the movement range of an image.

Figure 5:
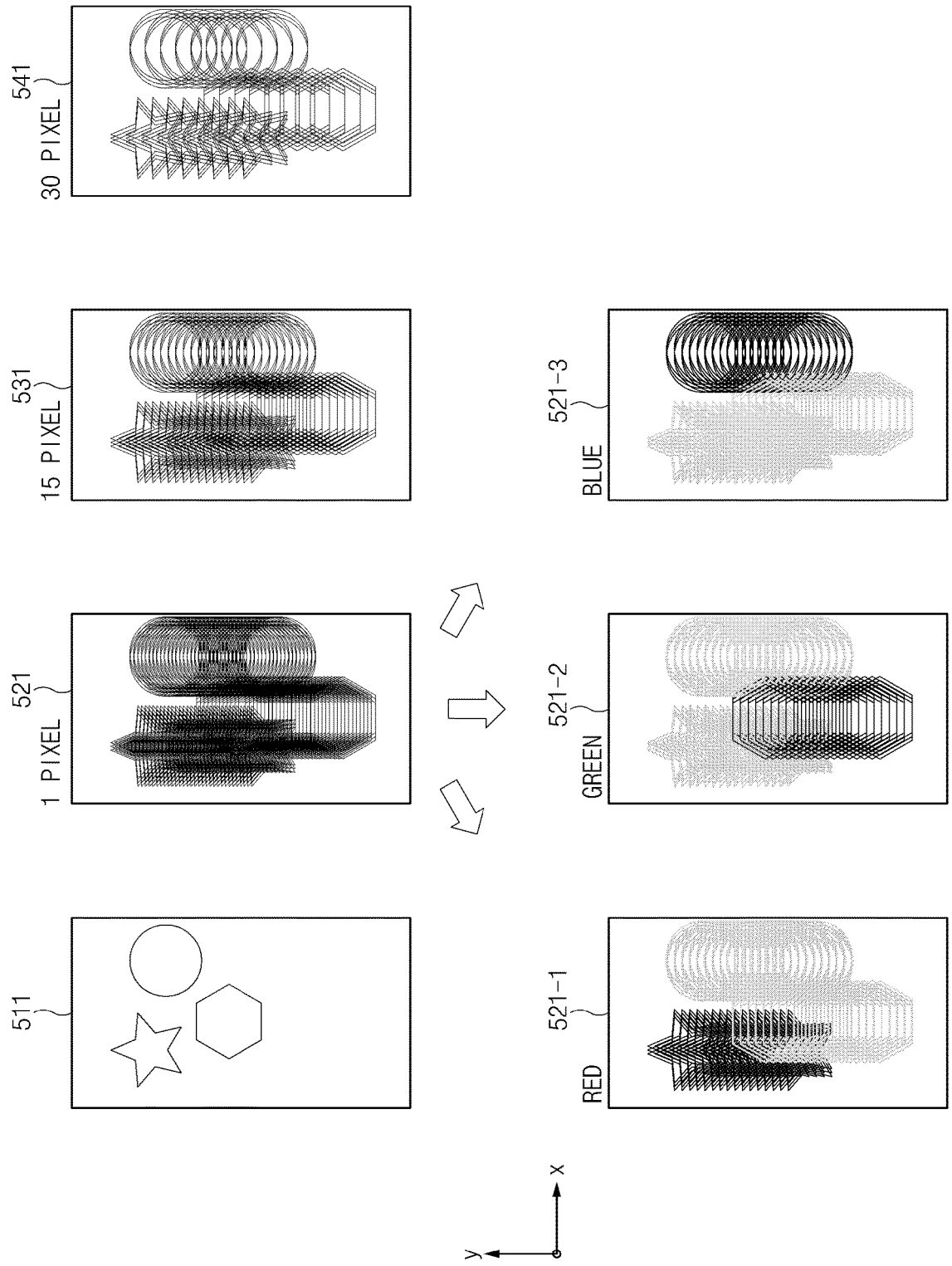
FIG. 5 illustrates an accumulated stress map, according to one embodiment of the present disclosure.

FIG. 5 illustrates an accumulated stress map, according to one embodiment of the present disclosure.

According to an embodiment, the processor 440 may generate an accumulated stress map including accumulated stress values for a plurality of pixels included in the display 420 when moving an image based on the specific movement interval during the specified movement period. The accumulated stress value of a pixel may be proportional to the brightness (or the pixel value) of the pixel and the amount of time the pixel is on. According to an embodiment, the processor 440 may generate the accumulated stress map via a simulation without actually displaying the image on the display 420.

According to an embodiment, the processor 440 may generate a plurality of accumulated stress maps according to a plurality of movement intervals. For example, the processor 440 may generate a first accumulated stress map when the image is moved based on a first movement interval. The processor 440 may also generate a second accumulated stress map when the image is moved based on a second movement interval. As another example, referring to FIG. 5, if the image 511 is selected, the processor 440 may generate the first accumulated stress map 521 while moving the selected image 511 by a first movement interval (e.g., 1 pixel) during a specified movement period. Alternatively, the processor 440 may generate a second accumulated stress map 531 while moving the selected image 511 by a second movement interval (e.g., 15 pixels) during the specified movement period. Further, the processor 440 may generate a third accumulated stress map 541 while moving the selected image 511 by a third movement interval (e.g., 30 pixels) during the specified movement period.

According to an embodiment, the processor 440 may generate a plurality of accumulated stress maps for each color channel (or a sub pixel). For example, the processor 440 may display an image on the display 420 based on red, green, and blue channels. The processor 440 may generate three separate accumulated stress maps for red, green and blue channels, respectively, for one movement interval. Referring to FIG. 5, the processor 440 may generate first accumulated stress map 521 while moving the selected image 511 by a first movement interval (e.g., 1 pixel). Afterwards, the processor 440 may generate a first accumulated color stress map 521-1 corresponding to the red channel from the first accumulated stress map 521. Similarly, the processor 440 may generate a second accumulated color stress map 521-2 corresponding to the green channel and a third accumulated color stress map 521-3 corresponding to the blue channel from the first accumulated stress map 521. Although not illustrated in FIG. 5, with regard to each of the second accumulated stress map 531 and the third accumulated stress map 541, the processor 440 may generate three accumulated color stress maps for each or either accumulated stress map. Where the accumulated stress maps illustrated in FIG. 5 is darker, the corresponding accumulated stress value of the pixel (or sub pixel) may be higher.

Figure 6:
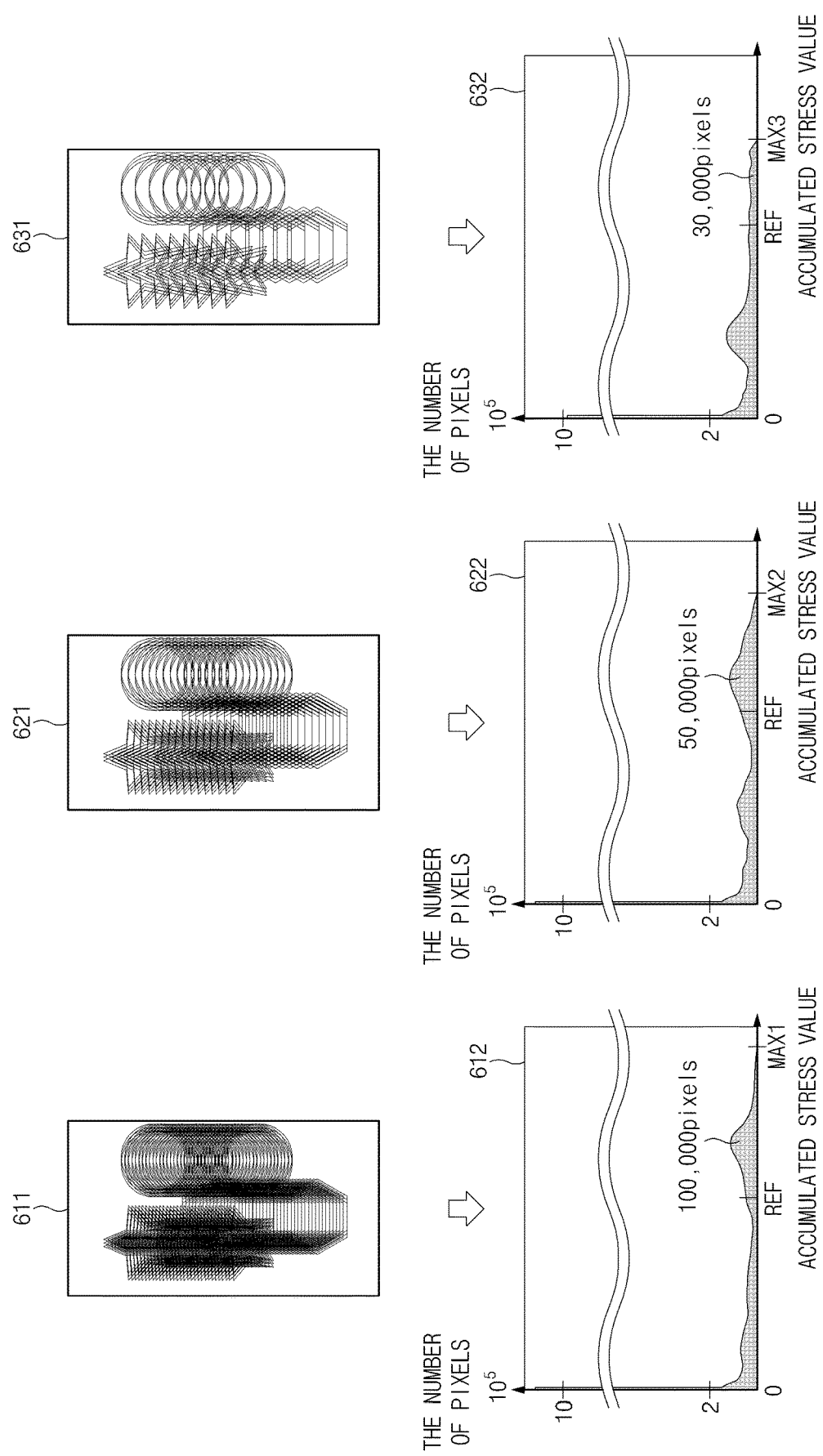
FIG. 6 illustrates a histogram of an accumulated stress value, according to one embodiment of the present disclosure.

FIG. 6 illustrates a histogram of an accumulated stress value, according to one embodiment of the present disclosure.

Referring to FIG. 6, the processor 440 may generate the first accumulated stress map 611 while moving the selected image (e.g., the image 511 of FIG. 5) by the first movement interval (e.g., 1 pixel) during the specified movement period, the second accumulated stress map 621 while moving the selected image by the second movement interval (e.g., 15 pixels) during the specified movement period, and the third accumulated stress map 631 while moving the selected image by the third movement interval (e.g., 30 pixels) during the specified movement period.

The accumulated stress maps may be represented by histograms showing the number of pixels corresponding to the accumulated stress values included therein. Referring to FIG. 6, a first histogram 612 corresponding to the first accumulated stress map 611, a second histogram 622 corresponding to the second accumulated stress map 621, and a third histogram 632 corresponding to the third accumulated stress map 631 are illustrated. The "x" axis of the histogram may indicate accumulated stress values, and the "y" axis of the histogram may indicate the number of pixels having the accumulated stress value.

According to one embodiment of the present disclosure, the processor 440 may set the movement interval of an image based on a plurality of accumulated stress maps generated from simulations of a plurality of movement intervals.

According to an embodiment, the processor 440 may set the movement interval of an image based on a representative value (e.g., a maximum value) of the accumulated stress values included in the accumulated stress map. According to an embodiment, the processor 440 may identify the maximum value of each accumulated stress map and may set the movement interval of the image to be the movement interval used to generate the accumulated stress map where the maximum value is the smallest.

For example, the processor 440 may identify the maximum values of each of the first, second, and third accumulated stress maps. If the maximum value of the first accumulated stress map is less than the maximum value of the second and third accumulated stress maps, the processor 440 may set the first movement interval as the movement interval of the image.

As illustrated in FIG. 6, the first accumulated stress map 611 may have the first maximum value MAX1, the accumulated second stress map 621 may have the second maximum value MAX2, and the third accumulated stress map 631 may have the third maximum value MAX3. The processor 440 may compare the first, second, and third maximum values MAX1 to MAX3 and may set the third movement interval (e.g., 30 pixels) used to generate the third accumulated stress map 631 as the movement interval of the image, because the third maximum value MAX3 is the smallest among the three.

A higher maximum value indicates that the pixels of the display are subjected to more stress, and therefore more susceptible to burn-in. According to the above-described embodiment, burn-in may be prevented by setting the movement interval of the image such that the maximum value is reduced.

According to an embodiment, the processor 440 may set the movement interval of the image based on the number of pixels having accumulated stress values over a specified value (i.e. a reference value) in the accumulated stress map. When accumulated stress maps are generated for each color channel, the specified reference value may be different for each color channel. According to an embodiment, the specified value may be determined depending on the life expectancy for each color channel, which in turn depends on the material properties of the OLED display. For example, the blue channel, which is relatively vulnerable to burn-in, may have a lower reference value than other channels. According to an embodiment, for each accumulated stress map, the processor 440 may identify the number of pixels having accumulated stress values greater than the specified value. The processor 440 may then set the movement interval of the image as the movement interval used to generate the accumulated stress map corresponding to the smallest number of pixels over the reference value.

For example, the processor 440 may calculate the number of pixels having accumulated stress values greater than the specified value in the first accumulated stress map, and may calculate the number of pixels having accumulated stress values greater than the specified value in the second accumulated stress map. If the number of pixels in the first accumulated stress map is less than the number of pixels in the second accumulated stress map, the processor 440 may set the first movement interval as the movement interval of the image. Alternatively, if the number of pixels in the first accumulated stress map is greater than the number of pixels in the second accumulated stress map, the processor 440 may set the second movement interval as the movement interval of the image.

As illustrated in FIG. 6, the number of pixels having accumulated stress values greater than a specified value REF in the first accumulated stress map 611 may be 100,000. The number of pixels having accumulated stress values greater than the specified value REF in the second accumulated stress map 621 may be 50,000. The number of pixels having accumulated stress values greater than the specified value REF in the third accumulated stress map 631 may be 30,000. The processor 440 may compare the number of pixels among the first, second, and third accumulated stress maps and determine the third accumulated stress map has the least number of pixels. Accordingly, the processor may set the third movement interval (e.g., 30 pixels) used to generate the third accumulated stress map 631 as the movement interval of the image.

A higher number of pixels having accumulated stress values greater than the specified value may indicate that more pixels are subjected to stress. Accordingly, the possibility that burn-in may occur increases. According to the above-described embodiment, burn-in may be prevented by setting the movement interval of the image such that the number of pixels having high accumulated stress values is reduced.

According to an embodiment, the processor 440 may set the movement interval of the image based on the gradient of the accumulated stress values included in the accumulated stress map. The gradient of the accumulated stress value may mean a difference in accumulated stress values between adjacent pixels. For example, the processor 440 may calculate the gradient of the accumulated stress values along a first axis (e.g., a horizontal axis or an "x" axis) direction in the accumulated stress map and may calculate the gradient of the accumulated stress value along a second axis (e.g., a vertical axis or a "y" axis) direction.

According to an embodiment, the processor 440 may set the movement interval of the image based on the representative value (e.g., a maximum value or an average value) of the gradient of the accumulated stress values in the accumulated stress map. For example, the processor 440 may identify the maximum value or the average value of the gradient of each accumulated stress map and may set the movement interval of the image as the movement interval used to generate the accumulated stress map where the maximum value or the average value of the gradient is the smallest.

For example, the processor 440 may identify the maximum value of the gradient for the first accumulated stress map generated based on the first movement interval. The processor 440 may then identify the maximum value of the gradient of the second accumulated stress map generated based on the second movement interval. If the maximum value of the gradient of the first accumulated stress map is less than the maximum value of the gradient of the second accumulated stress map, the processor 440 may set the first movement interval as the movement interval of the image. But if the maximum value of the gradient of the first accumulated stress map is not less than the maximum value of the gradient of the second accumulated stress map, the processor 440 may set the second movement interval as the movement interval of the image.

According to an embodiment, the processor 440 may set the movement interval of the image based on the number of pixels having a gradient greater than a specified value (or a reference value). According to an embodiment, the processor 440 may identify the number of pixels having gradients greater than the specified value for each accumulated stress map. The processor 440 may then set the movement interval of the image as the movement interval used to generate the accumulated stress map where the number of pixels is the smallest.

For example, the processor 440 may calculate the number of pixels having gradients greater than a specified value in the first accumulated stress map. The processor 440 may then calculate the number of pixels having gradients greater than the specified value in the second accumulated stress map. If the number of pixels in the first accumulated stress map is less than the number of pixels in the second accumulated stress map, the processor 440 may set the first movement interval as the movement interval of the image. If the number of pixels in the first accumulated stress map is greater than the number of pixels in the second accumulated stress map, the processor 440 may set the second movement interval as the movement interval of the image.

A higher maximum value (or an average value) of the accumulated stress gradient may indicate that the difference of the accumulated stress between adjacent pixels is greater. Similarly, a higher number of pixels having gradients greater than a specified value may indicate that the difference of the accumulated stress between adjacent pixels is greater. Accordingly, burn-in at locations where pixels experience greater gradients may be more noticeable. According to the above-described embodiment, burn-in may be prevented by setting the movement interval of the image such that the gradient of the accumulated stress value is reduced.

As described with reference to FIG. 5, the processor 440 may generate accumulated stress maps for each color channel. According to an embodiment, the processor 440 may set different movement intervals for each color channel based on the accumulated stress maps generated for each color channel. For example, the processor 440 may set a movement interval corresponding to the red channel based on the plurality of accumulated stress maps for the red channel, may set a movement interval corresponding to the green channel based on the plurality of accumulated stress maps for the green channel, and may set a movement interval corresponding to the blue channel based on the plurality of accumulated stress maps for the blue channel.

According to an embodiment, the processor 440 may use one of the movement intervals for the color channels as the movement interval of the image. For example, the processor 440 may set the movement interval of the image using the smallest of the movement intervals for the color channels. As another example, the processor 440 may set the movement interval of the image as the movement interval of the blue channel, which is relatively more vulnerable to burn-in.

According to an embodiment, the processor 440 may use the weighted average value of the movement intervals for each color channel as the movement interval of the image. For example, the processor 440 may assign different weights for each color channel depending on the life expectancy of each color channel. For example, the processor 440 may assign a higher weight to the blue channel because it is relatively more vulnerable to burn-in.

According to an embodiment, when setting the movement interval of the image based on the accumulated stress map, the processor 440 may set the movement interval of the image by using the actual accumulated stress map of the display 420. For example, the processor 440 may add the accumulated stress value generated through simulation to the accumulated stress value of the actual accumulated stress map of the display 420, and may set the movement interval of the image based on the summation. For example, the processor 440 may set the movement interval of the image based on a representative value of the summed accumulated stress values, the number of pixels with accumulated stress values greater than a specified value (or a reference value), the gradient of the accumulated stress values, the number of pixels having gradients greater than or equal to a specified value (or a reference value), or the like.

According to an embodiment, the movement interval of the image may be fixed in advance, so that it may be impossible to change the movement interval of the image. When the movement interval of the image is fixed, the accumulated stress map corresponding to the fixed movement interval of the image may be used to modify the image.

Figure 7:
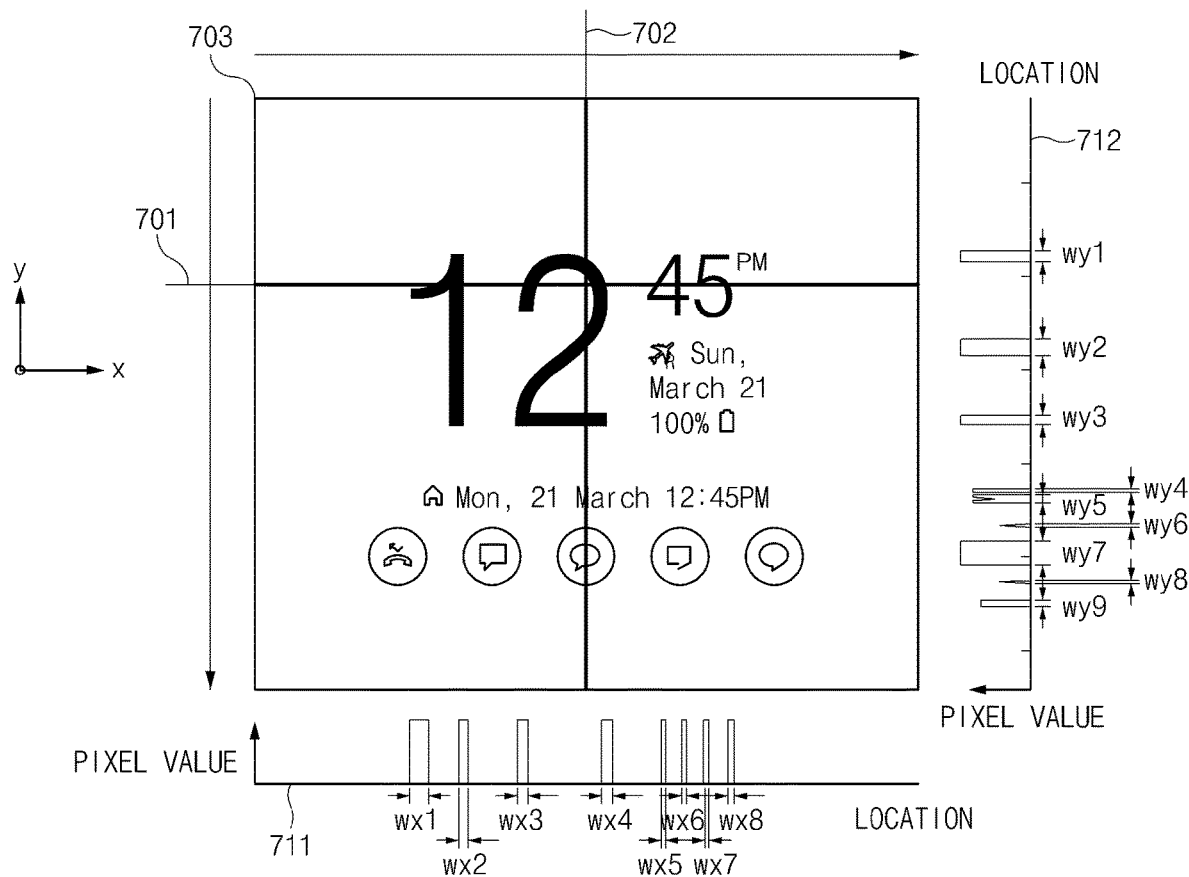
FIG. 7 illustrates a spatial frequency analyzing result, according to one embodiment of the present disclosure.

FIG. 7 illustrates a spatial frequency analyzing result, according to one embodiment of the present disclosure.

As described below, if an image is selected to be displayed, the processor 440 may analyze the spatial frequency of the image. The processor 440 may set the movement interval of the image based on a spatial frequency analyzing result.

According to an embodiment, the processor 440 may analyze the spatial frequency along a first axis (e.g., a horizontal axis or an "x" axis) direction of the image and the spatial frequency along a second axis (e.g., a vertical axis or a "y" axis) direction perpendicular to the first axis direction. For example, referring to FIG. 7, the processor 440 may obtain a graph 711 indicating pixel values at specific locations by analyzing pixels using the virtual horizontal line 701. The graph 711 may show the pixel values of the effective pixels of the image 703 as first axis direction width information wx1 to wx8. The processor 440 may analyze the pixels included in the image 703 line by line, by for example, moving the virtual line 701 from one end of the image 703 to the other end thereof along the second axis (e.g., the vertical axis or the "y" axis) direction, and sequentially analyzing the pixels on the virtual line 701. The processor 440 may obtain first axis direction width information and/or information about the frequency at which the effective pixels appear. The processor 440 may also obtain a graph 712 indicating pixel values at specific locations by analyzing pixels using the virtual vertical line 702. The graph 712 may show the pixel values of the effective pixels of the image 703 as second axis direction width information wy1 to wy9. The processor 440 may analyze the pixels included in the image 703 vertical line by vertical line, by from example, moving the virtual line 702 from one end of the image to the other end thereof along the first axis direction. The processor 440 may obtain second axis direction width information and/or information about the frequency at which the effective pixels appear.

According to an embodiment, the processor 440 may set a first axis movement interval of the image based on analyzing the spatial frequency of the first axis direction. Similarly, the processor 440 may set a second axis movement interval of the image based on analyzing the spatial frequency of the second axis direction. According to an embodiment, the processor 440 may set a representative value (e.g., a average value, a maximum value, or a mode) for the width information as the movement interval of the image. According to an embodiment, the processor 440 may set the movement interval of the image by using only width information that is greater than a specified width. For example, to set the movement interval in the first axis direction, the processor 440 may use the first to fourth width information wx1 to wx4 and exclude the fifth to eighth width information wx5 to wx8 in graph 711. As another example, to set the movement interval in the second axis direction, the processor 440 may use the first to third and seventh width information wy1 to wy3 and wy7 and exclude the fourth to sixth, eighth, and ninth width information wy4 to wy6, wy8, and wy9 in graph 712.

According to an embodiment, the processor 440 may analyze the spatial frequency of the image for each color channel. For example, the processor 440 may analyze the spatial frequency of the image for red, green, and blue channels. According to an embodiment, the processor 440 may set the movement interval for each color channel based on analyzing the spatial frequency for each color channel.

According to an embodiment, the processor 440 may use one of the movement intervals for the color channels as the movement interval of the image. For example, the processor 440 may set the movement interval of the image using the smallest of the movement intervals for the color channels. As another example, the processor 440 may set the movement interval of the image to be the movement interval of the blue channel, which is relatively more vulnerable to burn-in.

According to an embodiment, the processor 440 may use the weighted average value of the movement intervals for each color channel as the movement interval of the image. For example, the processor 440 may assign different weights for each color channel depending on the life expectancy of each color channel. For example, the processor 440 may assign a higher weight to the blue channel because it is relatively more vulnerable to burn-in.

According to the above-mentioned embodiment, the burn-in phenomenon may be prevented by setting the movement interval of the image based on the spatial frequency of the image such that the gradients of the accumulated stress values for the pixels are reduced.

FIG. 8 illustrates a movement period of an image, according to one embodiment of the present disclosure.

Referring to an image 801 of FIG. 8, the processor 440 may set a reference location Pr in a display area of the display 420. For example, the processor 440 may set the center of the display 420 to the reference location Pr. According to an embodiment, the processor 440 may set the movement range of the image based on a distance 'd' between a display location Pi and the reference location Pr of the image. The display location Pi of the image may be the middle point of the image or the center of gravity of effective pixels included in the image. For example, referring to the image 801 of FIG. 8, the display location Pi of a watch image 811 displayed on the display 420 may be the middle point of the watch image.

An image 802 of FIG. 8 may be a graph indicating the movement period of the image according to the distance 'd' between the display location and the reference location according to an embodiment. According to an embodiment, the processor 440 may set the movement period of the image to be longer when the display location of the image is closer to the reference location, and may set the movement period of the image to be shorter when the display location of the image is further apart from the reference location. For example, the processor 440 may set the movement period of the image, as a function of the distance 'd' to conform to a normal distribution curve.

In the case where the movement period of the image changes depending on the distance from the reference location, the amount of time when the image is statically displayed around the reference location without movement may be longer than when the image is displayed further from the reference location. When the reference location is the center of the display, since the amount of time when the image is statically displayed at the center of the display is lengthened, the visibility of the image may be improved.

FIG. 9 illustrates a burn-in phenomenon preventing effect, according to one embodiment of the present disclosure.

Referring to FIG. 9, with regard to various images 911, 921, 931, and 941, the maximum gradient of accumulated stress values in the conventional case, and the maximum gradient of the accumulated stress values according to an embodiment of the present disclosure where the images move to prevent burn-in are illustrated. It may be verified that the maximum gradient of the accumulated stress values according to the present disclosure is less than the maximum gradient of the accumulated stress values in the conventional case.

In addition, referring to FIG. 9, with regard to the various images 911, 921, 931, and 941, cross sections 912, 922, 932, and 942 of accumulated stress maps in the conventional case and cross sections 913, 923, 933, and 943 of accumulated stress maps according to an embodiment of the present disclosure are illustrated. It may be verified that the slopes in the cross section according to the present disclosure is gentler than the slopes of the cross sections of the conventional case. In other words, the change in gradient is less according to the present disclosure.

Figure 10:
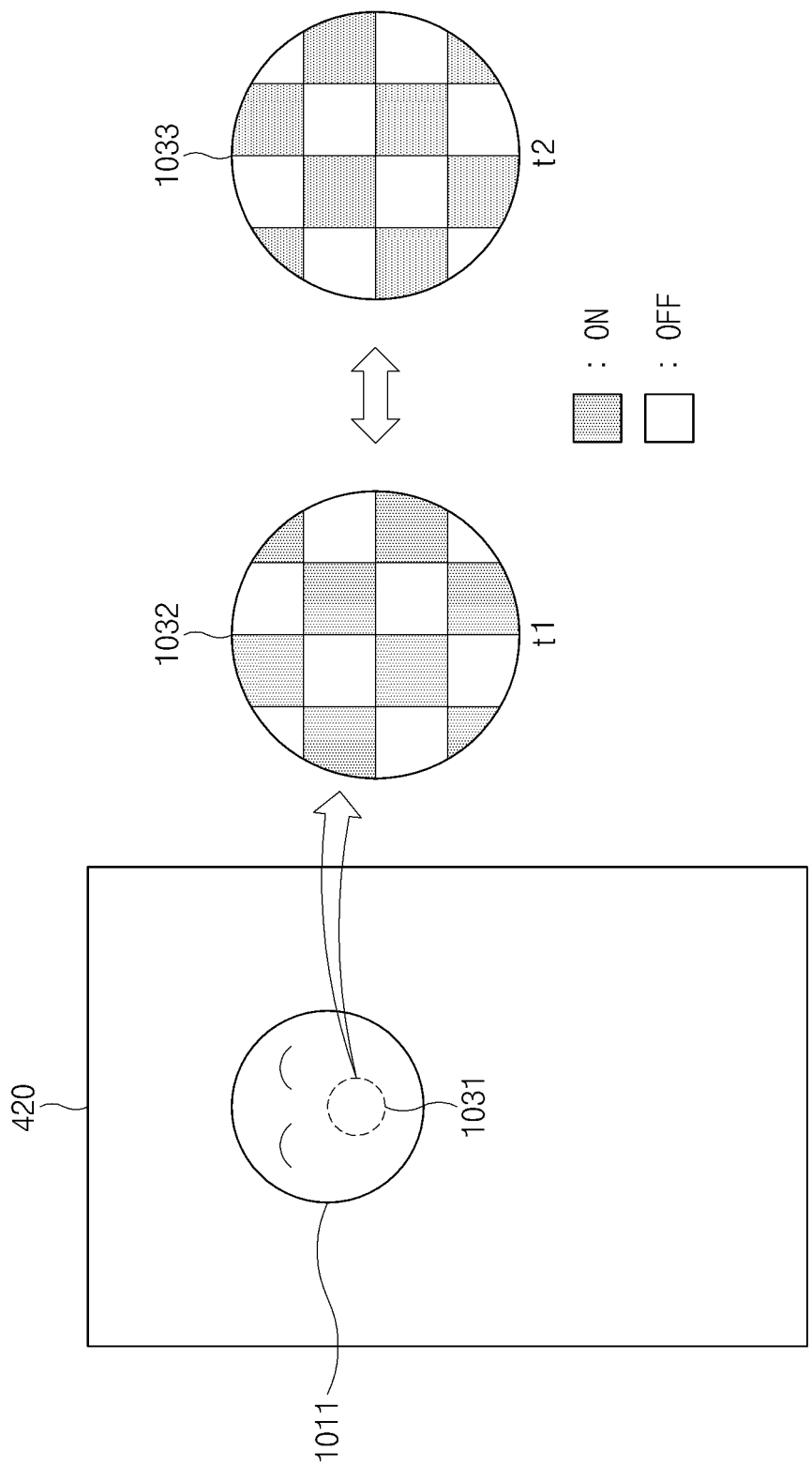
FIG. 10 illustrates an image displaying method, according to one embodiment of the present disclosure.

FIG. 10 illustrates an image displaying method, according to one embodiment of the present disclosure.

According to an embodiment, the processor 440 may divide effective pixels for each color channel corresponding to the image into a plurality of groups. For example, the processor 440 may classify a plurality of effective pixels into a first group and a second group. According to an embodiment, when displaying the image on the display 420, the processor 440 may display only some of the plurality of groups and may not display the remaining groups. For example, referring to FIG. 10, the processor 440 may display a smile image 1011 on the display 420. Referring to a first image 1032 obtained by enlarging a partial area 1031 of the smile image 1011, the processor 440 may display the smile image 1011 by using pixels of the first group.

According to an embodiment, the processor 440 may alternately display the plurality of groups at specified time intervals. For example, as illustrated in FIG. 10, referring to the first image 1032 and a second image 1033 obtained by enlarging the partial area 1031 of the smile image 1011, the processor 440 may display the smile image 1011 by using pixels of the first group at a first time point t1 and may display the smile image 1011 by using pixels of the second group at a second time point t2.

According to an embodiment described with reference to FIG. 10, burn-in may be suppressed by displaying only some effective pixels of an image such that the accumulated stress values of the pixels are reduced.

Figure 11:
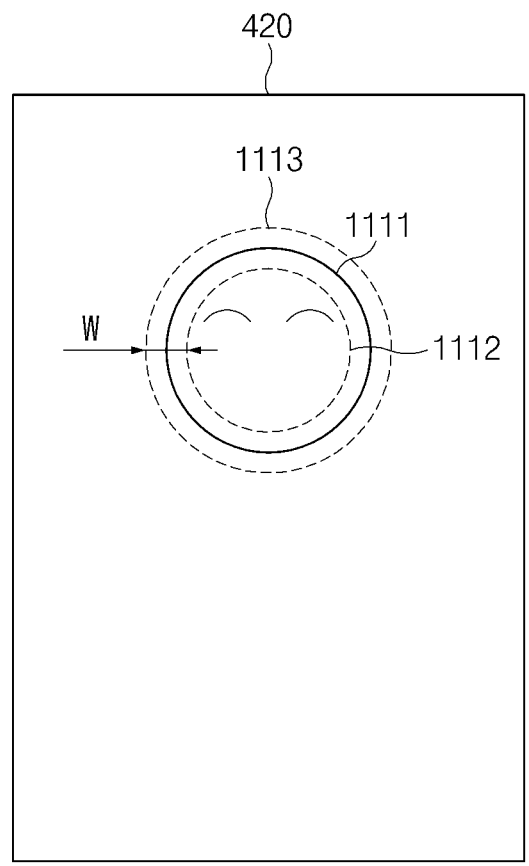
FIG. 11 illustrates an image displaying method, according to one embodiment of the present disclosure.

FIG. 11 illustrates an image displaying method, according to one embodiment of the present disclosure.

According to an embodiment, when displaying an image on the display 420, the processor 440 may periodically change the size of the image. For example, the time period when the size of the image is changed may be shorter than the movement period of an image. For example, referring to FIG. 11, the processor 440 may display a smile image 1111 on the display 420. The processor 440 may display the smile image 1111 while periodically changing the size of the smile image 1111 in the range between a first size 1112 and a second size 1113. The processor 440 may sequentially (e.g., gradually increasingly) change the size of the smile image 1111 or may randomly change the size of the smile image 1111 within the first size 1112 and second size 1113.

According to an embodiment described with reference to FIG. 11, the variation in the accumulated stress values of pixels at the boundary of the image may be reduced by periodically changing the size of the image. Accordingly, burn-in may be prevented.

The embodiments described with reference to FIGS. 10 and 11 may be implemented separately or together.

FIG. 12 illustrates a block diagram of the electronic device, according to an embodiment of the present disclosure.

Referring to FIG. 12, an electronic device 1200 (e.g., the electronic device 400 of FIG. 4) may include an input module 1210, a display 1220, a memory 1230, a processor 1240, and a sensor 1250.

According to an embodiment, the input module 1210 may include a touch panel 1211 and a touch controller IC 1213. With respect to the touch panel 1211, specified physical quantities (e.g., voltage, detected light quantity, resistance, charge quantity, capacitance, or the like) may be changed by a user touch. According to an embodiment, the touch panel 1211 may be disposed over the display panel 1221.

According to one embodiment, the touch controller IC 1213 may detect the change in physical quantity in the touch panel 1211 and may calculate a location at which the user touch is made based on the change in the physical quantity. The calculated location, which may be in the form of coordinates, may be provided to the processor 1240 (e.g., an AP 1241). The touch controller IC 1213 may include a driver circuit, a sensor circuit, control logic, an oscillator, a delay table, an analog-digital converter, a micro control unit (MCU), and the like.

For example, if a portion of user's body (e.g., a finger), a stylus (for example an electronic pen), or the like contacts the display 1220, a coupling voltage between a transmitter Tx and a receiver Rx included in the touch panel 1211 may vary. The change of the coupling voltage may be sensed by the touch controller IC 1213, and the touch controller IC 1213 may transmit the coordinates of the location to the processor 1240.

According to various embodiments, the touch controller IC 1213 may be referred to as a "touch IC," a "touch screen IC," a "touch controller," a "touch screen controller IC," or the like. In the meantime, according to another embodiment, in an electronic device in which the touch sensor IC 1213 is not included, the processor 1240 (e.g., a sensor hub 1245) may perform the role of the touch controller IC 1213. In addition, according to yet another embodiment, the touch controller IC 1213 and the processor 1240 may be implemented as a single chip.

According to an embodiment, the display 1220 may include the display panel 1221 and the display driving IC (DDI) 1223. The display panel 1221 may receive an image driving signal from the DDI 1223. The display panel 1221 may display a user interface or a variety of content (e.g., text, image, video, icon, symbol, or the like) based on the image driving signal.

According to an embodiment, the DDI 1223 may drive the display panel 1221. The DDI 1223 may transmit the image driving signal corresponding to image information, which is received from the processor 1240 (e.g., the AP 1241), to the display panel 1221 at a preset frame rate. According to one embodiment, the DDI 1223 and the processor 1240 may be implemented as a single chip.

According to an embodiment, the DDI 1223 may include a graphic random access memory (GRAM) 10 and a controller 20. Although not illustrated in FIG. 12, the DDI 1223 may include an interface module, an image processing unit, a multiplexer, a display timing controller (T-con), a source driver, a gate driver, and/or an oscillator.

According to an embodiment, the GRAM 10 may store image data provided from the processor 1240 (e.g., the AP 1241, a CP 1243, or the sensor hub 1245). The GRAM 10 may be of a size corresponding to the resolution and/or the number of color gradations of the display panel 1221. The GRAM 10 may be referred to as a "frame buffer" or a "line buffer." According to an embodiment, the GRAM 10 may be electrically connected with the DDI 1223 and/or may be a component separate from the DDI 1223.

According to an embodiment, the controller 20 may be configured to output at least a portion of image data stored in the GRAM 10 to a specified area of the display panel 1221. For example, when pieces of image data are stored in the GRAM 10, the controller 20 may be configured to output at least one of the pieces of image data. In this case, when the image data to be output is specified, the controller 20 may use the data address of the GRAM 10 and output image data according to the size of the image data to be output. For example, the controller 20 may select image data corresponding to the specified data size from the specific data address as the data to be output.

According to an embodiment, the controller 20 may be configured to change the location of the image data to be output to the specified area of the display panel 1221. According to an embodiment, the controller 20 may change the location of the image data based on a control signal from the processor 1240 (e.g., the AP 1241). For example, the controller 20 may receive the control signal, which includes information about at least one of a movement range, a movement interval, and a movement period associated with the image data, from the processor 1240. The controller 20 may be configured to change the location of the image data depending on the movement interval and the movement period within the movement range in response to the control signal.

According to an embodiment, the processor 1240 may provide image data to the DDI 1223. According to an embodiment, the processor 1240 may provide the DDI 1223 with the control signal (or information about methods to display the image) associated with the image. According to an embodiment, after providing the DDI 1223 with the image data and/or the control signal associated with the image data, the processor 1240 may be configured to enter sleep mode. That is, after storing the image data in the GRAM 10 of the DDI 1223, the processor may not intervene in the operation of the DDI 1223.

According to an embodiment, the processor 1240 may include an application processor (AP) 1241, a communication processor (CP) 1243, and a sensor hub 1245.

According to an embodiment, for example, the AP 1241 may receive a command from other elements through an internal bus, may decode the received command, and may perform an arithmetic operation or data generation and processing according to the decoded command.

According to an embodiment, the CP 1243 may manage a data link in communication between the electronic device 1200 and other electronic devices connected with the electronic device 1200 over a network and may execute functions related to the communication protocol. The CP 1243 may provide the user with communication services such as voice calls, video calls, text messages (e.g., SMS, MMS, or the like), packetized data, or the like.

According to an embodiment, the sensor hub 1245 may control the sensor 1250 by using a micro controller unit (MCU) included in the sensor hub 1245. For example, sensor hub 1245 may collect sensing information detected by the sensor 1250 and may control the operation of the sensor 1250. According to an embodiment, the sensor 1250 may include a temperature/humidity sensor, a biometric sensor, a barometric pressure sensor, a gyro sensor, or the like.

Although not illustrated in FIG. 12, the electronic device 1200 may include a housing (not illustrated). The housing may form at least part of the exterior of the electronic device 1200. For example, the housing may include a front surface (a first surface) facing in the upper direction, a rear surface (a second surface) opposite to the front surface, and a side surface at least partially between the front surface and the rear surface.

According to an embodiment, the display 1220 (e.g., the display panel 1221) may be disposed on the front surface of the electronic device 1200. As another example, the display 1220 may be disposed in the housing and may be exposed through the front surface which may be transparent.

According to one embodiment of the present disclosure, at least some of the operations of the processor (e.g., the processor 440 of FIG. 4) disclosed above performs may be performed by another electronic device, for example a server connected to communicate with an electronic device. For example, an external server may analyze the features of the image to be displayed. The external server may modify the image based on the results of the analysis or may set a movement range, a movement interval, and a movement period of the image based on the analysis.

Figure 13:
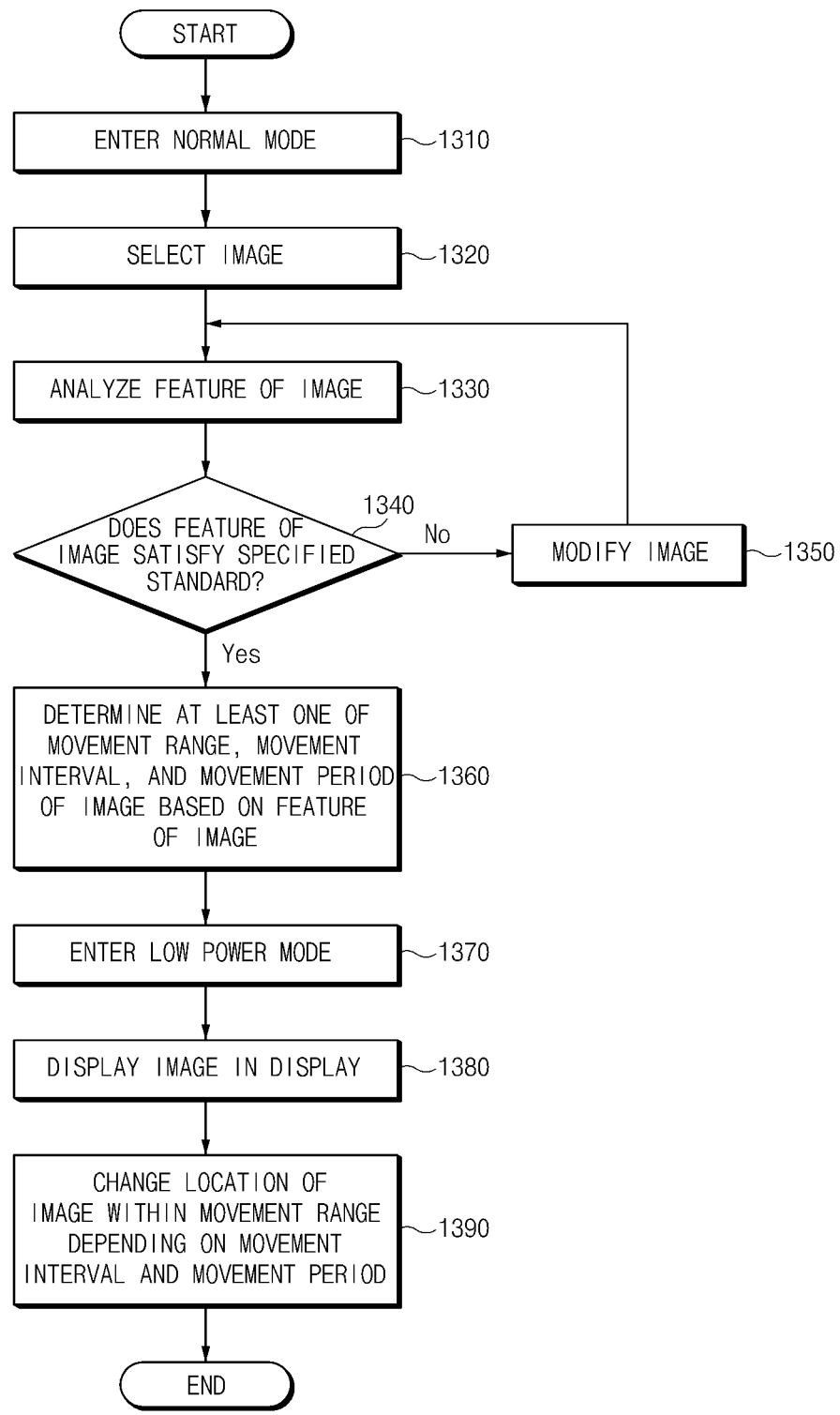
FIG. 13 is a flowchart illustrating an image displaying method of an electronic device, according to one embodiment of the present disclosure.

FIG. 13 is a flowchart illustrating an image displaying method of an electronic device, according to one embodiment of the present disclosure.

The flowchart illustrated in FIG. 13 may include operations that an electronic device (e.g., the electronic device 400 of FIG. 4) performs. Even though omitted below, detailed descriptions about the electronic device described with reference to FIGS. 1 to 12 may be applied to the flowchart shown in FIG. 13.

According to an embodiment, in operation 1310, the electronic device (e.g., the processor 1240 of FIG. 12) may enter the normal mode. For example, as explained above, the normal mode may be the awake mode, where all the elements of the electronic device are activated or operate without power reduction. For example, the electronic device may enter the normal mode upon wake, which occurs when a user input is received or when the electronic device is notifying the user of an incoming phone call.

According to an embodiment, in operation 1320, the electronic device (e.g., the processor 1240 of FIG. 12) may select an image. According to an embodiment, the electronic device may select the image depending on user input or a specified standard or condition. For example, the electronic device may receive a user input that selects the image from images stored in memory. The image is to be displayed when the display is in the AOD state.

According to an embodiment, in operation 1330, the electronic device (e.g., the processor 1240 of FIG. 12) may analyze the features of the image. For example, the electronic device may analyze the size (e.g. width and height) of the image, the middle point of the image, the center of gravity of effective pixels included in the image, the effective pixel ratio of the image, the average pixel value of the image, the maximum pixel value of the image, the deviation (e.g., average deviation or standard deviation) of pixel values of the image, the luminance (e.g., maximum luminance or average luminance) of the display when the image is displayed, the OPR of the image, the accumulated stress value of pixels according to the movement of the image, or the spatial frequency of the image.

According to an embodiment, in operation 1340, the electronic device (e.g., the processor 1240 of FIG. 12) may determine whether some or all of the features satisfies specified standards. For example, the electronic device may compare the size of the image, the effective pixel ratio of the image, the average pixel value of the image, the maximum pixel value of the image, the deviation of the pixel values of the image, the luminance of the display when the image is displayed, and/or the OPR of the image with specified standards, respectively.

According to an embodiment, if the features of the image do not satisfy the specified standards, in operation 1350, the electronic device (e.g., the processor 1240 of FIG. 12) may modify the image so that it satisfies the specified standards. For example, if the size of the image does not satisfy the specified standard, the electronic device may reduce the size of the image. As another example, if the average pixel value or the maximum pixel value of the image does not satisfy the specified standards, the electronic device may darken the image by lowering the pixel value of the image. As another example, if the OPR of the image does not satisfy the specified standard, the electronic device may reduce the size of the image, may lower the pixel value of the image, or may remove a part of the image.

According to an embodiment, after modifying the image, in operation 1330, the electronic device may analyze the features of the image again. In operation 1340, the electronic device may determine whether the features of the modified image satisfies the specified standards.

According to an embodiment, if the features of the modified image satisfy the specified standard, in operation 1360, the electronic device may determine at least one of a movement range, a movement interval, and a movement period of the image based on the features of the image.

According to an embodiment, the electronic device may set the movement range of the image based on the size of the image. For example, the electronic device may set the movement range of the image to be relatively large when the image is relatively larger. Conversely, the electronic device may set the movement range of the image to be relatively small when the image is relatively small.

According to an embodiment, the electronic device may generate an accumulated stress map including accumulated stress values of a plurality of pixels when the image is moved based on a specific movement interval during a specified time period. According to an embodiment, the electronic device may generate a plurality of accumulated stress maps according to a plurality of movement intervals. According to an embodiment, the electronic device may determine the movement interval of the image based on the plurality of accumulated stress maps generated.

According to an embodiment, the electronic device may determine the movement interval of an image based on the representative value (e.g., a maximum value) of accumulated stress values included in the accumulated stress maps. For example, the electronic device may identify the maximum accumulated stress value of each of the plurality of accumulated stress maps and may select the movement interval used to generate the accumulated stress map with the smallest maximum value as the movement interval of the image.

According to an embodiment, the electronic device may determine the movement interval of the image based on the number of pixels having accumulated stress values greater than a reference value in the accumulated stress map. For example, the electronic device may identify the number of pixels having accumulated stress values greater than the reference value in each of the plurality of accumulated stress maps. The electronic device may then select the movement interval corresponding to the accumulated stress map with the least number of pixels as the movement interval of the image.

According to an embodiment, the electronic device may determine the movement interval of the image based on the gradient of accumulated stress values included in the accumulated stress maps. According to an embodiment, the electronic device may determine the movement interval of the image based on the representative value (e.g., a maximum value or an average value) of the gradient of accumulated stress values included in the accumulated stress maps. For example, the electronic device may identify the maximum value or the average value of the gradient in each of the plurality of accumulated stress maps. The movement interval used to generate the accumulated stress map with the smallest gradient may be used as the movement interval of the image. According to an embodiment, the electronic device may set the movement interval of the image based on the number of pixels having gradient of the accumulated stress values greater than a specified value or a reference value. For example, the electronic device may identify the number of pixels having gradients greater than the specified value in the plurality of accumulated stress maps. Then, the electronic device may select the movement interval used to generate the accumulated stress map with the least number of pixels as the movement interval of the image.

According to an embodiment, the electronic device may generate a plurality of accumulated stress maps for each color channel (or a sub pixel) and may determine the movement interval for each color channel based on the accumulated stress map generated for each color channel. Then, the electronic device may select one of the movement intervals for the color channels as the movement interval of the image. As another example, the electronic device may use a weighted average of the movement intervals for the color channels as the movement interval of the image.

According to an embodiment, the electronic device may determine the movement interval of the image based on a spatial frequency analysis of the image. According to an embodiment, the electronic device may analyze a spatial frequency in a first axis (e.g., a horizontal axis or an "x" axis) direction of the image and a spatial frequency in a second axis (e.g., a vertical axis or a "y" axis) direction perpendicular to the first axis. According to an embodiment, the electronic device may set a first axis movement interval of the image based on the result of analyzing the spatial frequency of the first axis direction and may set a second axis movement interval of the image based on the result of analyzing the spatial frequency of the second axis direction.

According to an embodiment, the electronic device may analyze the spatial frequency of the image for each color channel. For example, the electronic device may determine movement intervals for each color channel based on the result of analyzing the spatial frequency for each color channel. According to an embodiment, the electronic device may select one of the movement intervals for color channels as the movement interval of the image. Alternatively, the electronic device may use the weighted average of the movement intervals for the color channels as the movement interval of the image.

According to an embodiment, the electronic device may set a reference location in a display area of a display. According to an embodiment, the electronic device may set the movement period of the image based on a distance between the display location of the image and the reference location. According to an embodiment, the electronic device may set the movement period of the image to be relatively longer when the display location of the image is relatively closer to the reference location. Conversely, the electronic device may set the movement period of the image to be relatively shorter when the display location of the image is relatively further away from the reference location. For example, the electronic device may set the movement period of the image as a function of the distance between the reference location and the display location of the image, such that the function conforms to a normal distribution curve.

According to an embodiment, in operation 1370, the electronic device (e.g., the processor 1240 of FIG. 12) may enter the low power mode. For example, the low power mode may be the sleep mode, where at least some of elements in the electronic device operate at reduced power or are deactivated. For example, the electronic device may enter the low power mode when it receives a user input to enter the low power mode. Alternatively, the electronic device may enter the low power mode when it does not receive user input for a specified time period.

According to an embodiment, in operation 1380, the electronic device (e.g., the DDI 1223 of FIG. 12) may display the image on the display. For example, the electronic device may display the image within the specified movement range.

According to an embodiment, in operation 1390, the electronic device (e.g., the DDI 1223 of FIG. 12) may change the location of the image within the set movement range depending on the determined movement interval and the determined movement period.

According to an embodiment, the electronic device may classify effective pixels of the image into a plurality of groups. Accordingly, when displaying the image on the display, the electronic device may display only one or more pixel groups and may not display the remaining groups. In one embodiment, the effective pixels may be classified according to their color.

According to an embodiment, when displaying the image on the display, the electronic device may periodically change the size of the image. For example, the time period when the size of the image is changed may be shorter than the movement period of the image.

According to various embodiments of the present disclosure, the burn-in phenomenon occurring in a display may be prevented by modifying the image or by setting at least one of a movement range, a movement interval, and a movement period of the image, based on the features of the image.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The term "module" used herein may represent, for example, a unit including one or more combinations of hardware, software and firmware. The term "module" may be interchangeably used with the terms "unit", "logic", "logical block", "component" and "circuit". The "module" may be a standalone unit or part of an integrated component. The "module" may be implemented mechanically or electronically. For example, the "module" may include at least one of an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media in the form of a program module. The instruction, when executed by a processor, may cause the one or more processors to perform a function corresponding to the instruction. The computer-readable storage media, for example, may be a memory.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments of the present disclosure, and vice versa.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
 a display;
 a display driver integrated circuit (DDI) electrically coupled with the display;
 a memory configured to store an image; and
 a processor configured to:
   analyze a horizontal spatial frequency of pixels included in the image line by line, from one end of the image to the other end of the image along a vertical axis, analyze a vertical spatial frequency of pixels included in the image line by line, from one end of the image to the other end of the image along a horizontal axis, and determine pixel width information obtained from the analyzed horizontal and vertical spatial frequencies as horizontal and vertical movement intervals of the image, respectively, wherein the movement interval is a distance by which the image is to be moved on the display, and wherein the DDI is configured to:

display the image on the display when at least part of the processor is deactivated; and change a display location of the image within a movement range depending on the movement interval.

2. The electronic device of claim 1, wherein the processor is further configured to:

analyze a plurality of spatial frequencies for each color channel of the image;

determine a plurality of movement intervals for the each color channel based on the plurality of spatial frequencies;

determine a weighted average of the plurality of movement intervals; and select the weighted average as the movement interval of the image.

3. The electronic device of claim 1, wherein the processor is further configured to:

analyze a plurality of spatial frequencies for each color channel of the image;

determine a plurality of movement intervals for the each color channel based on the plurality of spatial frequencies; and select one of the plurality of movement intervals as the movement interval of the image.

4. An image displaying method of an electronic device, the method comprising:

analyzing, using a processor, a horizontal spatial frequency of pixels included in the image line by line, from one end of the image to the other end of the image along a vertical axis;

analyzing, using the processor, a vertical spatial frequency of pixels included in the image line by line, from one end of the image to the other end of the image along a horizontal axis;

determining, using the processor, pixel width information obtained from the analyzed horizontal and vertical spatial frequencies as horizontal and vertical movement intervals of the image, respectively, wherein the movement interval is a distance by which the image is to be moved on the display;

displaying the image on a display when at least part of the processor is deactivated; and changing a display location of the image within a movement range depending on the movement interval and a movement period, wherein the movement period is a time period for the image to be displayed at one location to avoid burn-in of the display.

* * * * *